US008718676B2

(12) United States Patent
Soma et al.

(10) Patent No.: US 8,718,676 B2
(45) Date of Patent: May 6, 2014

(54) TIME AND POWER BASED WIRELESS LOCATION AND METHOD OF SELECTING LOCATION ESTIMATE SOLUTION

(71) Applicant: TruePosition, Inc., Berwyn, PA (US)

(72) Inventors: Pitchaiah Soma, Downingtown, PA (US); Pete A. Boyer, Chesterbrook, PA (US); Rashidus S. Mia, Phoenixville, PA (US)

(73) Assignee: TruePosition, Inc., Berwyn, PA (US)

( * ) Notice: Subject to any disclaimer, the term of this patent is extended or adjusted under 35 U.S.C. 154(b) by 0 days.

(21) Appl. No.: 13/861,943

(22) Filed: Apr. 12, 2013

(65) Prior Publication Data
US 2013/0231133 A1 Sep. 5, 2013

Related U.S. Application Data

(60) Division of application No. 13/624,654, filed on Sep. 21, 2012, which is a continuation-in-part of application No. 12/980,116, filed on Dec. 28, 2010, now Pat. No. 8,315,647.

(51) Int. Cl.
*H04W 24/00* (2009.01)
(52) U.S. Cl.
USPC .................. 455/456.1; 455/404.2; 455/456.2; 455/456.5; 455/456.6

(58) Field of Classification Search
None
See application file for complete search history.

(56) References Cited

U.S. PATENT DOCUMENTS

| | | | |
|---|---|---|---|
| 6,782,264 B2 | 8/2004 | Anderson | |
| 6,950,664 B2 | 9/2005 | Chen et al. | |
| 7,072,666 B1 | 7/2006 | Kullman et al. | |
| 7,486,233 B2 | 2/2009 | Stenberg et al. | |
| 7,783,299 B2 | 8/2010 | Anderson et al. | |
| 2003/0139188 A1 | 7/2003 | Chen et al. | |
| 2006/0267840 A1 | 11/2006 | Stenberg et al. | |
| 2007/0232327 A1 | 10/2007 | Laroia et al. | |
| 2007/0254673 A1 | 11/2007 | Stenberg et al. | |
| 2008/0130480 A1 | 6/2008 | Li et al. | |
| 2008/0188244 A1* | 8/2008 | Mazlum et al. | 455/456.6 |
| 2008/0214205 A1 | 9/2008 | Alles et al. | |
| 2009/0131073 A1 | 5/2009 | Carlson et al. | |
| 2010/0120447 A1 | 5/2010 | Anderson et al. | |

OTHER PUBLICATIONS

3rd Generation Partnership Project (3GPP), TS 04.08, V7.21.0, 3rd Generation Partnership Project; Technical Specification Group Core Network; "Mobile radio interface layer 3 specification" (Release 1998), Dec. 2003, 623 pages.
U.S. Appl. No. 11/736,950, filed Apr. 18, 2007, Mia et al.
3rd Generation Partnership Project (3GPP), TS 05.08, V8.23.0, 3 rd Generation Partnership Project; Technical Specification Group GSM/EDGE Radio Access Network; "Radio subsystem link control", (Release 1999), section 3, Nov. 2005, 100 pages.

(Continued)

*Primary Examiner* — Suhail Khan
(74) *Attorney, Agent, or Firm* — Baker & Hostetler LLP

(57) ABSTRACT

Disclosed is a method for processing readily available radio network, timing and power information about cellular networks and typical measurements made by the mobile device and network. A probabilistic method is disclosed that uses both time (i.e., range) and power differences with known downlink transmitter antenna characteristics to locate mobiles with accuracy better than cell-ID with ranging, with high capacity, and without the need for field calibration.

26 Claims, 19 Drawing Sheets

(56) References Cited

OTHER PUBLICATIONS

3$^{rd}$ Generation Partnership Project (3GPP), TS 31.111, V9.6.0, 3$^{rd}$ Generation Partnership Project; Technical Specification Group Core Network and Terminals; Universal Subscriber Identity Module (USIM) Application Toolkit (USAT), (Release 9), Jun. 2011, 109 pages.

3 rd Generation Partnership Project (3GPP), TS 36.305, V9.3.0, 3 rd Generation Partnership Project; Technical Specification Group Radio Access Network; Evolved Universal Terrestrial Radio Access Network (E-UTRAN); "Stage functional specification of User Equipment (UE) positioning in E-UTRAN", (Release 9), section 4.3.3, Jun. 2010, 52 pages.

3$^{rd}$ Generation Partnership Project (3GPP), TS 43.059, V9.0.0, 3$^{rd}$ Generation Partnership Project; Technical Specification Group GSM/EDGE Radio Access Network; "Functional stage 2 description of Location Services (LCS) in GERAN", (Release 9), section 4.2.1, Nov. 2009, 69 pages.

3$^{rd}$ Generation Partnership Project (3GPP) TS 11.14, V8.18.0, 3$^{rd}$ Generation Partnership Project; "Specification of the SIM Application Toolkit (SAT) for the Subscriber Identity Module—Mobile Equipment (SIM-ME) interface", (Release 1999), Jun. 2007, 157 pages.

International Patent Application No. PCT/US11/064032: International Search Report and Written Opinion dated Feb. 29, 2012, 13 pages.

\* cited by examiner

TIME AND POWER BASED WIRELESS LOCATION AND METHOD OF SELECTING LOCATION ESTIMATE SOLUTION

CROSS REFERENCE

This application is a divisional of U.S. application Ser. No. 13/624,654, filed Sep. 21, 2012, currently pending, the content of which is hereby incorporated by reference in its entirety, which is a continuation-in-part of U.S. patent application Ser. No. 12/980,116, filed Dec. 28, 2010, now U.S. Pat. No. 8,315,647, the content of which is hereby incorporated by reference in its entirety.

TECHNICAL FIELD

The present invention relates generally to methods and apparatus for locating wireless devices, also called mobile stations (MS), such as those used in analog or digital cellular systems, personal communications systems (PCS), enhanced specialized mobile radios (ESMRs), and other types of wireless communications systems. More particularly, but not exclusively, the present invention relates to the position of mobile devices using pre-existing wireless infrastructure data.

BACKGROUND

Wireless communications networks (WCN) manage mobility of a wireless mobile device by collecting radio information about the network. From the advent of location-based services, this radio information has been used to provide low and medium accuracy location estimates.

In non-soft handoff systems, the location of every active mobile in the network is known to the nearest serving cell and sector. The identification of the serving cell and serving sector can be converted to a location estimate by simple translation to a pre-established latitude and longitude for the serving cell and/or sector.

Inclusion of the WCN measured time or mobile measured power based range estimate from the serving cell to the mobile position provides a method for refining the basic serving cell identifier based location estimate with minimal additional calculations.

A further refinement of the cell/sector identifier plus ranging method using the mobile-collected network information from one or more potential handover neighboring cells is generally known as Enhanced Cell-ID (ECID). The ECID technique relies on the mobile unit's ability to record the power levels from the beacons (also known as pilots) of multiple potential handover candidate/neighbor cells. This technique adds absolute power based and/or power-difference-of-arrival (PDOA) based measurements to improve the serving cell ranging location estimate.

Since typically the received signal power of various nearby transmitting cell sectors measured by the active mobile device is known by the WCN, the PDOA for ECID value is based on the received signal levels measured by the mobile for the serving cell's and/or one or more potential handover candidate/neighboring cell's beacons. Since the PDOA data collection requires visibility to two or more neighbor cell sites, location yield will be less than 100%. The effects of RF multipath, mobile receiver quality, and granularity of the measurement all act to reduce location accuracy for ECID. ECID in GSM, UMTS and LTE In GSM, ECID is also known as Network Measurement Report (NMR) location. The NMR is generated by the mobile to provide the WCN with information regarding the serving and neighboring cells to facilitate handover as described in GSM/3GPP Technical Standard 05.08, "*Radio subsystem link control*" section 3 (Handover).

The Enhanced Cell ID positioning technique is standardized as "Timing Advance" positioning in 3GPP TS 43.059, "*Functional stage 2 description of Location Services (LCS) in GERAN*" section, section 4.2.1. In LTE networks the "enhanced cell ID method" is described in 3GPP TS 36.305, "*Stage 2 functional specification of User Equipment (UE) positioning in E-UTRAN*" Section 4.3.3.

In the example GSM system, the NMR contains the mobile generated Measurement Results. The purpose of the Measurement Results information element is to provide the results of the measurements made by the mobile station regarding the serving cell and the neighbor cells. The Measurement Results information element is coded as shown in GSM/3GPP Technical Specification 04.08, "*Mobile radio interface layer 3 specification*" section 10.5.2.20 (Measurement Report).

The mobile location center (MLC) uses NMR delivered serving cell-id (in GSM the Cell-Global-Identity (CGI) gives the cell and sector) to consider the cell site's geographical location as the reference point. The reported timing advance (TA) value of the current serving cell allows computation of the range from the reference point. The Received Signal Strength Indicator (RSSI) of the serving cell is corrected with the current mobile dynamic power control settings, when received on traffic control channel instead of broadcast control channel. The corrected RSSI value of serving cell is then normalized with its known value of broadcast effective radiated power (ERP). The Reception Level (RxLev) values of the reported neighboring cells over Broadcast Control Channel (BCCH) beacons are then normalized against their known value of broadcast effective radiated power (ERP). Using the serving cell's antenna position, the TA-derived range, and the PDOA from three or more sites, a location estimate can be calculated.

Since ECID can use PDOA multi-lateration, the geographic layout of the neighbor cells also affects the quality of the location through geographic dilution of precision (GDOP). The limitation of only up to six neighbor cell RxLev measurements present in the NMR limits accuracy, when NMR data is not collected over a sufficient amount of the time interval by limiting potential GDOP reduction though receiver site selection.

Since the PDOA measurement requires averaging over multiple samples to nullify the received signal fast fading effects (the GSM NMR is transmitted by the mobile station periodically during an active call), latency is much higher than for other cell-ID based techniques.

Since the RSSI measurement for only the serving cell, when the mobile is in active mode is based on the variable power settings for the BTS, normalization of the serving cell RSSI before inclusion into the PDOA calculation requires knowledge of the BTS forward (downlink) power control settings from the GSM WCN.

Calibration may be used improve accuracy in ECID location systems. ECID Calibration can include the use of predictive RF propagation mapping and extensive drive testing to create a grid of CGI/RxLev "fingerprints". By mapping the neighbor list and received signal levels over the coverage area, it is possible to achieve medium accuracy results within the range of 200-500 meters in networks having relatively high BTS density.

In U.S. Pat. No. 7,434,233, a single site ECID location system is taught where the power measurements from a single 3-sector Base Transceiver Station (BTS) with a serving sector and two co-sited sectors allow the formation of a sector limited timing range band and a directional angle from the BTS cell site.

The inventive techniques and concepts described herein apply to time and frequency division multiplexed (TDMA/FDMA) radio communications systems including the widely used IS-136 (TDMA), GSM, and Orthogonal Frequency Division Multiplexed (OFDM) wireless systems such as LTE, LTE-Advanced and IEEE 802.16 (WiMAN/WiMAX). The Global System for Mobile Communications (GSM) model discussed is an exemplary but not exclusive environment in which the present invention may be used.

SUMMARY

Disclosed herein is a method for processing readily available radio network, timing and power information about cellular networks and typical measurements made by the mobile device and network. Different methods are disclosed that uses both time (i.e. range) and power differences to locate mobiles with accuracy better than cell-ID with ranging, with high capacity and without the need for calibration. In addition, we disclosed improved, computer-implemented methods for selecting a location estimate solution in a wireless location system.

One illustrative embodiment of the present invention provides for a method for use in locating a mobile device. This embodiment of the inventive method includes the step of causing a mobile device to receive beacon signals from a serving base transceiver station (BTS) and one or more adjacent BTS. Each BTS is located at a cell site and each beacon signal includes cell identification (CID) information. A number of sibling pairs based on the received beacon signals are detected. A sibling pair comprises two downlink transmission antennae of a multi-sector cell site, which are located relatively close to one another (for instance, within 100 meters) and their antenna pattern main beams pointing to different directions. Next, a predefined location method is selected based on the number of sibling pairs detected. The mobile device measures broadcast beacon power received from each of a number of cell sites and reports the power measured and identity of cell site sectors that have the largest measured powers, as well as a timing advance (TA) value determined by the network and relayed to the mobile device. The TA value serves as a range measurement from the serving cell sector to the mobile device In the illustrative embodiments, when the number of sibling pairs detected is zero, a power-difference-of-arrival with ranging (PDOA) location method is selected. When the number of sibling pairs detected is one, either a single site location method or an adjacent site location method is selected. When the number of sibling pairs detected is greater than one, one of either a power angle-of-arrival (AoA) location method or a power AoA with ranging location method is selected.

In the illustrative embodiments, the method may be employed to geolocate a mobile device operating in a sectored wireless communications network (WCN) with medium accuracy using information about the WCN that is stored in a database in combination with measurements made by the mobile device in the network in the course of supporting mobility. In this regard, a bearing/angle from a sectored cell site to the mobile device may be determined from power measurements from a pair of adjacent sectors (siblings) and knowledge of the spatial response and orientation of the sector antennas. Next, a timing range or power-derived range value from the serving cell with power difference measurements between siblings with the largest measured powers from one or more cell sites may be employed to determine a location estimate of the mobile device In the embodiments recounted above, the power AoA location method or power AoA with ranging location method comprises a probabilistic method for geolocation of mobile devices using sibling pairs. Timing (Timing Advance (TA) in GSM) information and power information from the wireless network is derived by creating a model of the timing advance and power difference between siblings of neighbor cells over the range band.

As mentioned, we also disclose methods for selecting a location estimate solution in a wireless location system. In one inventive embodiment, a method for selecting a location estimate solution comprises collecting network measurement report (NMR) data over a duration of time. (This is represented as STEP 1101 in FIG. 11.) Next, the NMR data are pre-processed (STEP 1102), and then the method involves determining from the pre-processed NMR data whether cells are present with valid timing measurements (STEP 1103). From here, various "scenarios" may be activated as described below. These are enumerated as scenarios LES1, LES2, LES3, LES4, LES5 and LES6 in the illustrative embodiments.

Additional features and aspects of the present invention are described below.

BRIEF DESCRIPTION OF THE DRAWINGS

The foregoing summary as well as the following detailed description are better understood when read in conjunction with the appended drawings. For the purpose of illustrating the invention, there is shown in the drawings exemplary constructions of the invention; however, the invention is not limited to the specific methods and instrumentalities disclosed. In the drawings.

DETAILED DESCRIPTION OF ILLUSTRATIVE EMBODIMENTS

Figure 1A:
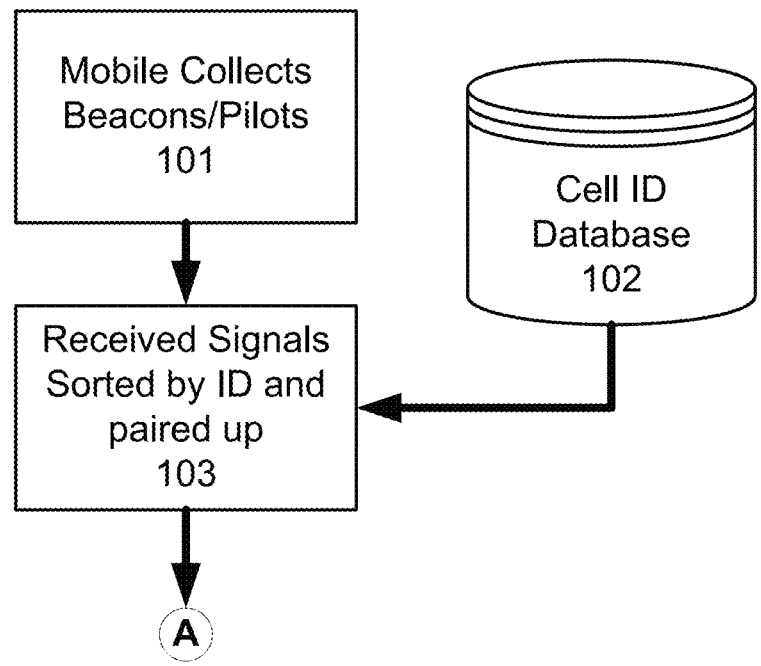
FIG. 1a schematically depicts initial signal collection and analysis.

We will now describe illustrative embodiments of the present invention. First, we provide a detailed overview of the problem and then a more detailed description of example embodiments of the present invention.

Overview

Determining the location of a mobile station transmitter is commonly achieved by measuring characteristics of the mobile station transmitter's uplink signal at a number of known receiving antenna locations. Also the location of a mobile station receiver is determined by measuring characteristics of the mobile station's serving cell site transmitter's and/or nearby potential handover/neighboring cell site transmitter's downlink signals by the mobile station. Typical characteristics measured include signal power (RSSI), time-of-arrival (TOA), angle-of-arrival (AoA), or any combination thereof GSM mobiles may be geolocated in sectored GSM networks with medium accuracy using information about the network that is readily available and measurements typically made by the Mobile Station (MS) in the network during course of supporting mobility.

The readily available network information includes the geographic location of the cell sites, the spatial response of the sectored antennas including their main beam pointing azimuthal and downtilt orientation, broadcast control channel (BCCH), base station color code (BSIC), effective radiated power (ERP) on broadcast control channel, and the unique sector identifiers that are broadcasted by each sector. For instance, GSM mobiles measure the broadcast beacon power received from each of a number of cell sites and report the power measured and identity (BCCH and BSIC) of up to six cell site sectors that have the largest measured powers to the network approximately at a rate of twice per second. Additionally, in GSM, a timing advance(TA) value is determined by the network and relayed to the mobile to permit the mobile to transmit over its entire time slot. The TA value also serves as a range measurement from the serving cell sector (CGI in GSM) to the mobile.

During the course of experimentation with Enhanced Cell-ID (ECID) location technology, it was determined that the power difference measurements between sectors of the base BTS possess minimum variability because path loss between the sectors and the mobile are cancelled out as the wireless channel between the two sectors and the mobile is fairly similar. With the ability to reject common bias from beacons of sectors of the same cell, the bearing, or angle, from a sectored cell site to the mobile transmitter can be determined from the power measurements from a pair of adjacent sectors, i.e. siblings, and knowledge of the spatial response and orientation of the sector antennas. Coupling the timing range (e.g. TA, RTT) or a power-derived range value from the serving cell with the power difference measurements between two sectors with the largest measured powers from one or more cell sites provide sufficient measurements to determine a location estimate of the mobile with accuracy better than cell-ID location with ranging. The Cell-ID with ranging location technique is well known (e.g., in GSM–CGI+TA, in UMTS–CID+RTT, or in LTE–PCI+$TA_{LTE}$).

FIG. 1a

FIG. 1a illustrates the initial steps in the mobile-assisted, network-based determination of location in accordance with the present invention. As shown, the mobile device collects the downlink beacon signal strengths and identifiers 101. The mobile transmits these signals to the Radio Access Network (RAN). This collection and transmission from the mobile device is performed by the mobile in the normal course of operation as part of the Mobile-Assisted-Handoff (MAHO) technique typically used by modern cellular systems.

The downlink beacon signal strengths and identifiers are forwarded by the RAN to the Serving Mobile Location Center (SMLC) or passively monitored and sent to the SMLC. Examples of passive monitoring triggering platforms are described in U.S. Pat. No. 6,782,225, "Monitoring of Call Information in a Wireless Location System" and U.S. Pat. No. 7,783,299; "Advanced Triggers for Location Based Service Applications in a Wireless Location System," both incorporated herein by reference.

The SMLC, part of the WLS, contains or has access to a database of beacon identifiers, transmitter antenna geographic locations, transmitter signal powers and radio base station downlink (transmit) antenna gain patterns. This database is deemed the cell-ID database 102. Using the cell-ID database and the collected signal information, the received signals are then sorted by cell (cell/sector) identifier and any sibling pairs identified 103. A sibling pair is two downlink transmission antennae of a multi-sector cell site that are located geographically close (e.g. separated by less than 100 meters) to each other and their horizontal antenna pattern main beams are pointing to different directions. Further processing, shown by the marker "A", is dependent on the number of sibling pairs detected.

FIG. 1b

Figure 1B:
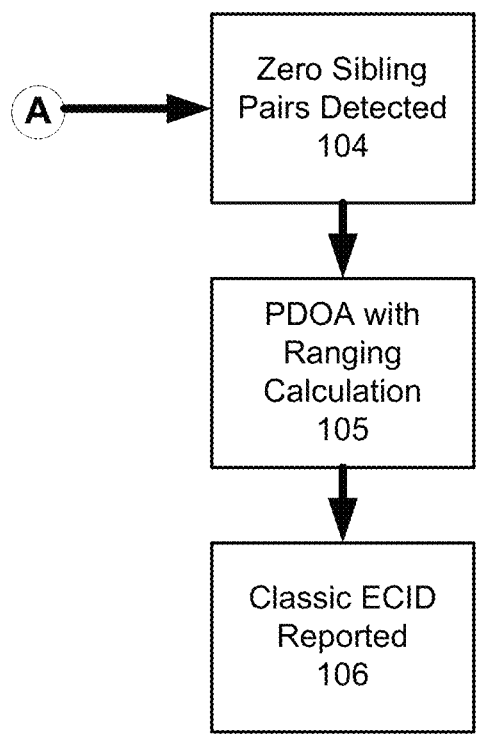
FIG. 1b illustrates a location process for the no sibling sector case.
Figure 1C:
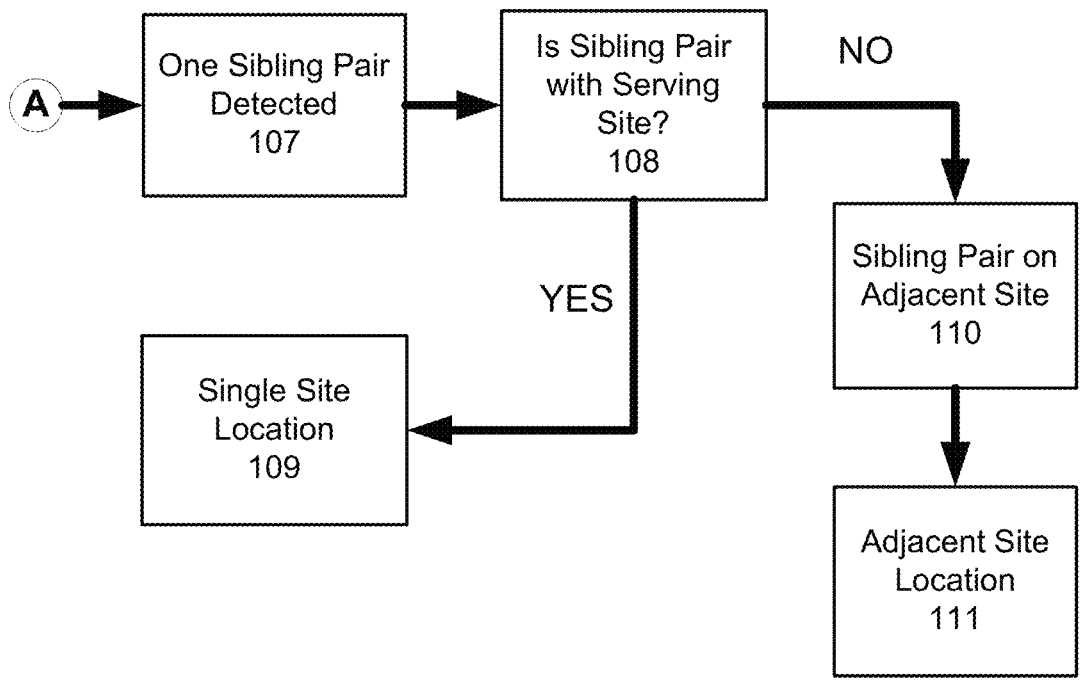
FIG. 1c illustrates a location process for a single sibling pair scenario.
Figure 1D:
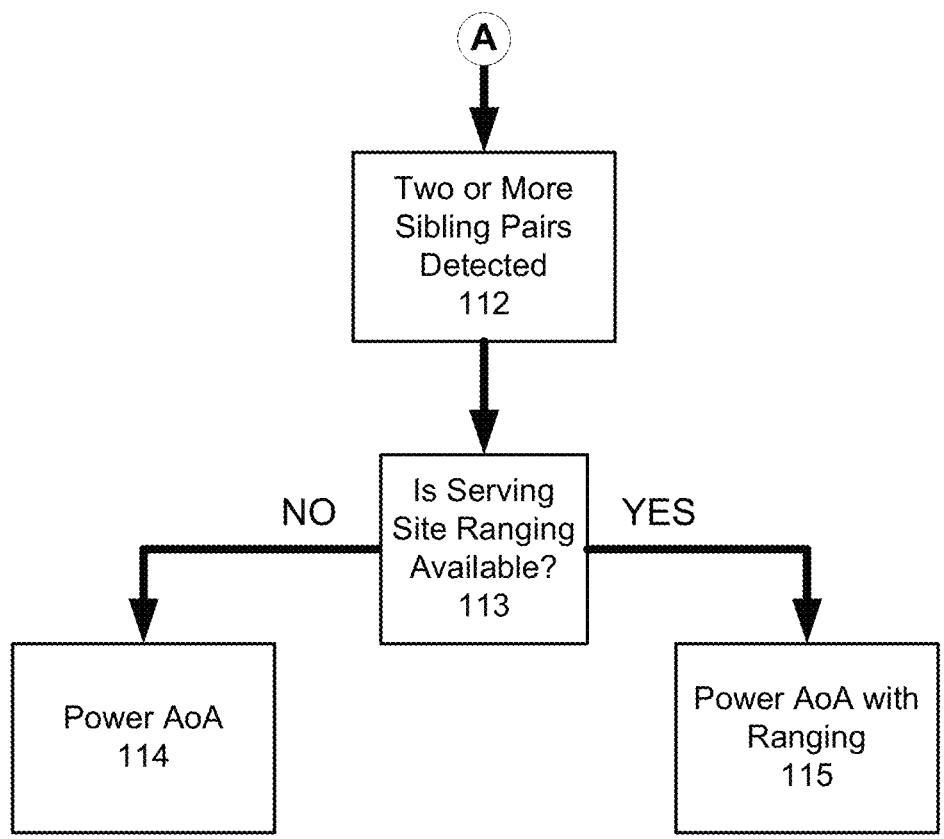
FIG. 1d illustrates a location process for when two or more sibling pairs are detected.

FIG. 1b depicts the case where no sibling pairs were detected 104. Since no siblings are available, only a power-difference-of-arrival with ranging calculation can be performed 105. Since only a classic enhanced-cell ID (ECID) location can be reported 106, the location accuracy will vary widely based on the cell structure and coverage areas.

With ECID, the cell-ID (CGI) component will allow determination of the latitude and longitude of the serving tower or sector antenna while the Timing Advance (TA) determined ranging from serving cell site location allows for reduction of the location error radius in radial direction from serving cell site to a band approximately 554 meters wide, when there are no measurement errors in reported TA exist in the case of sectored cells. But the location error radius in azimuth angular direction increases proportional to the increased TA value or distance from serving cell. If sufficient (three or more) neighbor cells are available via the mobile device beacon collection and if the cell geometry does not result in extremely high geometric dilution of precision, the added PDOA-based location measurement can significantly improve location accuracy along azimuth angular direction, especially at larger TA values over that of a CGI+TA location estimate.

FIG. 1c

If a sibling pair is detected 107 from the analysis 103 of the mobile collected signal data 102, then a power-based angle of arrival technique can be used to improve the classic ECID location.

The sibling pair is further analyzed to determine if the sibling pair is associated with the serving cell 108. If yes, then a single site location 109 will be performed as detailed in U.S. Pat. No. 7,434,233. If the sibling pair is found to be associated with an adjacent cell site 110, then Adjacent Site Location 111 is performed.

FIG. 1d

If more than one sibling pair is detected 112 from the analysis 103 of the mobile collected signal data 102, then a power-based angle of arrival technique can be used to improve the classic ECID location. Availability of two or more sibling pairs also allows for location even if the time or power based ranging is not available or not granular enough (for instance in GSM, the timing range band increments in 554 meter steps) to allow a precise location. With each sibling pair allowing a power-based Angle of Arrival (AoA) to be determined, this technique has been deemed "power AoA".

If serving site ranging is available 113, then a power AoA with ranging calculation is possible 115. If serving site ranging is not available, a purely power AoA calculation 114 is still possible.

Power-based Angle of Arrival

The angle-of-arrival (AoA), or line-of-bearing (LOB), of a signal can be determined from a common site location to the mobile position to be estimated by receiving the signals from two antennas that are co-sited or located in close geographic proximity (e.g., spaced 10's of meters from each other) and pointed in different directions. The decibel power, i.e. dBm, of the signal received from each antenna is averaged over a period of time to mitigate the effect of fast fading. The decibel difference in the averaged signals from the two antennas is determined The AoA of the signal at mobile station can then be determined from this decibel difference and knowledge of their antennas spatial responses, operating frequencies and ERP values.

Many wireless communications systems break the 360 degree omnidirectional coverage into three overlapping sectors to increase their communications capacity through frequency reuse. A coverage area is defined as the area illuminated by the downlink beacon radio signal. Typically, the 360 degree, omnidirectional, coverage region is split into three 120 degree sectors through the use of directional antennas. Ideally, each sector antenna will cover only its 120 degree region and none of its adjacent sectors' regions. Practically, this would require a very large antenna so smaller antennas are utilized that overlap. Other sectorization plans (e.g. two 90 degree sectors, six 60 degree sectors) are supported.

Characterizing sector antennas in a generic fashion makes it easy to determine the AoA from the decibel power differences between two sibling antennas without collecting and maintaining large number of various manufactured antenna pattern data files in different file formats to be processed and then derive the appropriate pattern fitting model to be used in the closed form solution to estimate the azimuth angle of mobile station from the sibling pair cell site. Antennas can be characterized by their half-power-beamwidth (HPBW) in the vertical dimension, their HPBW in their horizontal dimension, and their front-to-back ratio (FBR). The HPBW of an antenna that is symmetric about its boresite is defined as the angular separation from a point on the left side of the antenna where its power response is 3 dB below its peak response at boresite to the point on the right side of the antenna where its power response is 3 dB below its peak response. The FBR of an antenna is defined as the decibel difference between the antenna's maximum decibel power response at its boresite to its decibel power response 180 degrees away from its boresite.

Antennas are often characterized in a normalized fashion by setting their maximum decibel power response to 0 dB. A generic model for the normalized, horizontal plane, decibel power response of an antenna can be expressed mathematically as:

$$G_{dB}(\theta) = \Omega_k (1 - [0.5 + 0.5 \cos(\theta)]^{60})$$

where the antenna pattern model parameter α is derived based upon the corresponding horizontal HPBW, $\Theta_h$ and front to back lobe ratio (FBR) in dB $\Omega_h$ as:

$$\alpha = \log_{10}(1 + 3/\Omega_h)/\log_{10}(0.5 + 0.5 \cos(\Theta_h/2))$$

Figure 9:
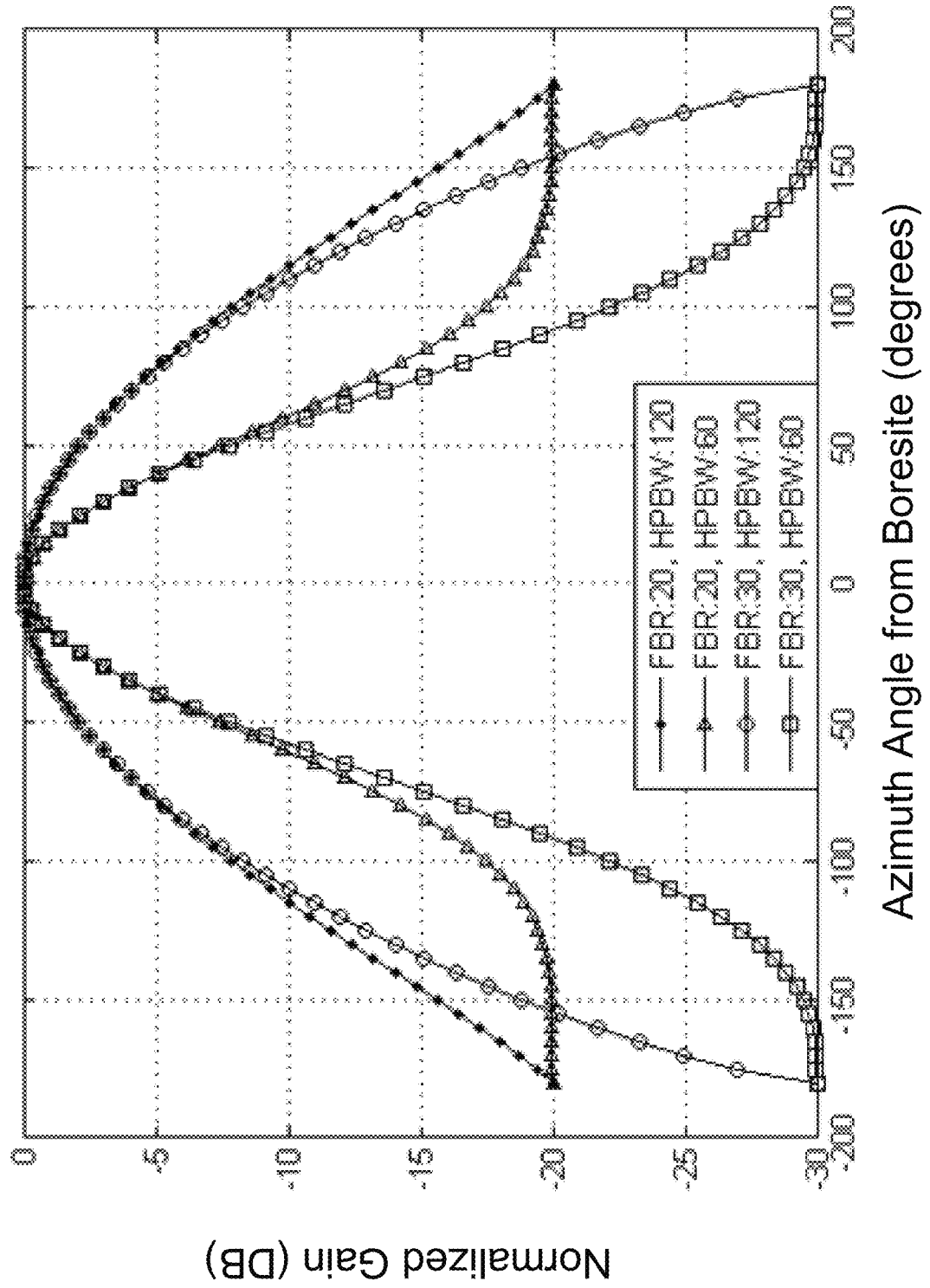
FIG. 9 illustrates radiation patterns of representative directional antenna using the half power beamwidth and front to back lobe ratio (FBR) values.

Plots of normalized antenna patterns for three different HPBW for two different FBR values are shown in FIG. 9.

Figure 10:
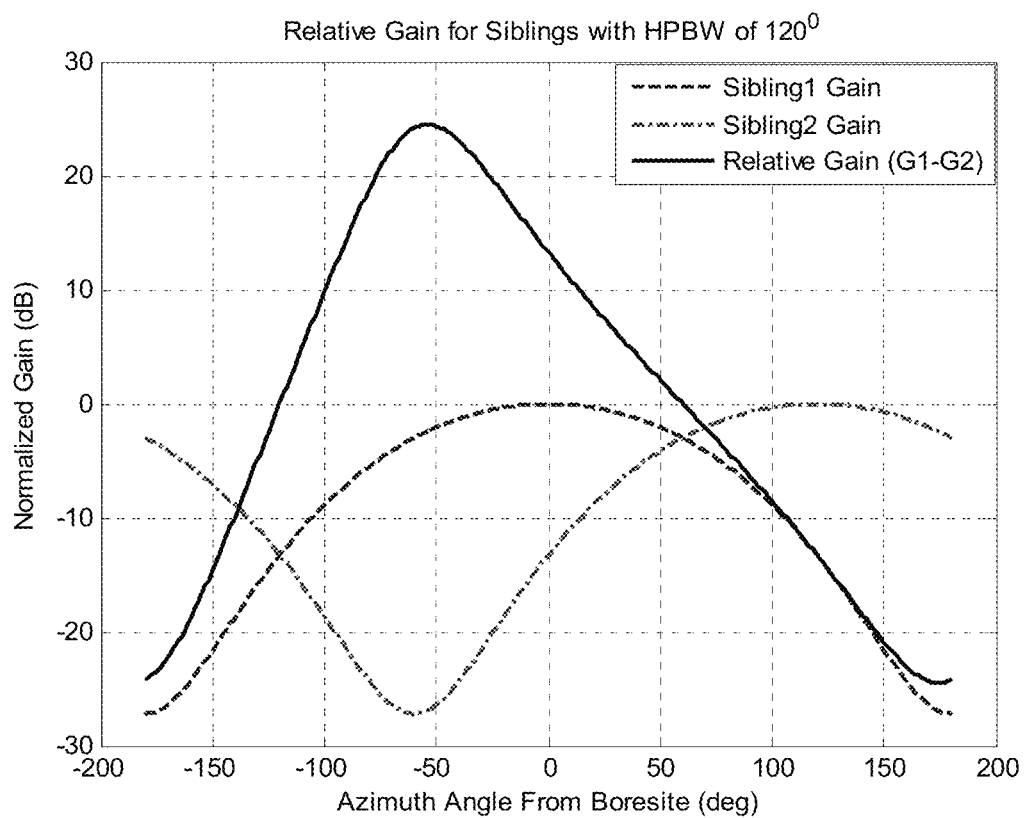
FIG. 10 illustrates a use of sibling pairs of antenna in the generation of an azimuth through relative gain with 120 degree directional antenna.

Similarly, a plot of the decibel power difference between two 120 degree HPBW antennas with boresites at 0 degrees and 120 degrees are shown in FIG. 10 for the entire 360 degrees omnidirectional response of both antennas. Note that between the two antennas boresites the power difference will vary from +12 dB to −12 dB in a linear fashion with a negative slope of −0.2 dB per degree. Also note that the decibel power difference is not single valued over the entire omnidirectional 360 degree range. Another duplicate value occurs outside the angular range between the two antennas' boresites. Thus when determining the AoA utilizing the power difference between these two antennas, two angles will result. One AoA is the correct one and the other is an ambiguous one. These types of ambiguous AoAs can be resolved using serving cell physical site information such as location, antenna boresite angle and TA information or when solving for the location of the mobile within a pre-defined search area of the primary serving cell TA band in a probabilistic manner.

Model Based Location Estimation Utilizing Sibling Sector Power Differences and Serving Sector Timing Advance Location estimation of mobiles operating on a wireless network can be achieved with measurements that are commonly made by the mobiles as well as timing measurements made by the network. Specifically, mobiles make power measurements of nearby cell sectors to assist in handoff to those sectors as they move about the coverage area. Networks make range timing measurements from the serving cell/sector site to the mobile to time synchronize the mobile to the network for proper operation. The decibel difference in the power between measurements of two adjacent sectors of a cell site, i.e. sibling pair, provides a robust indication of the direction the mobile with respect to the cell site. Practically, power difference measurements have two important advantages. First, common biases in the mobile's power measurement are cancelled, providing a more accurate measurement. Second, the wireless channel between the mobile and each of the two adjacent sectors will be similar, resulting in less variation between them which results in less variation in location estimates. Power difference measurements from two or more cell sites can be compared with a model over the coverage area to determine potential locations of the mobile. A range measurement from the serving cell site/sector can be used to limit the search range for locating a mobile, typically providing a unique location.

In an illustrative example, a transmitter and receiver are separated by a distance r and there is a direct path from the transmitter to the receiver and no multipath present, i.e. the definition of free space propagation. The transmitter has effective radiated power of $P_T$ and with a normalized antenna gain pattern of $G_T(\theta)$ where $\theta$ represents the spatial variation of the antenna's gain in azimuth plane. The received power is given as the transmitter power multiplied by the gains of the transmit antenna in the direction of the receiver $\theta_o$, multiplied by the effective area of the receive antenna $A_e(\theta)$ in the direction of the transmitter $\theta_o$. Additionally, we divide this quantity by the area of a sphere of radius r to account for the reduction in the power density of the RF signal at a distance r from the transmitter, or source, due to spherical spreading of the radio wave as it propagates from the transmitter to the receiver. This is written as:

$$P_R = \frac{P_T G_T(\theta_o) A_e(\theta_o)}{4\pi r^2}.$$

The effective area of the receive antenna is related to the gain of the receive antenna as:

$$G_R(\theta) = \frac{4\pi A_e(\theta)}{\lambda^2}$$

where $\lambda$ is the wavelength of the RF signal. Combining these two equations yields:

$$P_R = \frac{P_T G_T(\theta_o) G_R(\theta_o)}{\left(\frac{4\pi r}{\lambda}\right)^2}.$$

The product of the wavelength of the signal, $\lambda$, and its frequency, f, is equal to the speed of light, c, as:

$$c = f\lambda.$$

The speed of light is equal to $3 \times 10^8$ meters per second. The wavelength can be expressed in terms of the frequency of the signal in MegaHertz (MHz) as:

$$\lambda = \frac{300}{f_{MHz}}.$$

Substituting results in:

$$P_R = \frac{P_T G_T(\theta_o) G_R(\theta_o) 300^2}{(4\pi f_{MHz} r)^2}.$$

The above equation indicates that with all other parameters constant, the received power will vary as the inverse of the square of the distance from the transmitter. This is accurate for free space propagation; however, for the land mobile radio propagation channel the $1/r^2$ factor needs to be substituted by $1/Kr^\alpha$, where $\alpha$ is typically between 2 and 4, to model the received power correctly. Therefore, the power received for a land mobile propagation scenario is expressed as:

$$P_R = \frac{P_T G_T(\theta_o) G_R(\theta_o) 300^2}{(4\pi f_{MHz})^2 K r^\alpha}.$$

Taking 10 times the base 10 logarithm of the above equation yields the power in dBm as:

$$P_{R_{dBm}} = P_{T_{dBm}} + G_{T_{dB}}(\theta_o) + G_{R_{dB}}(\theta_o) + \\ 20\log_{10}\left(\frac{300}{4\pi}\right) - 20\log_{10}(f_{MHz}) - K_{dB} - 10\alpha\log_{10}(r).$$

In reality, various complex radio wave propagation mechanisms such as reflection, diffraction, and blockage of LOS path due to hilly terrain, manmade obstructions or foliage can cause an excess loss (Lex) along the radio propagation path. Modeling such complex propagation mechanisms to achieve low prediction error require state of the art modeling expertise as well as an expensive GIS database for modeling the environment along with good amount of field data collection to calibrate the propagation model. So the predicted received power can be expressed as:

$$P_{R_{dBm}} = P_{T_{dBm}} + G_{T_{dB}}(\theta_o) + G_{R_{dB}}(\theta_o) + \\ 20\log_{10}\left(\frac{300}{4\pi}\right) - 20\log_{10}(f_{MHz}) - K_{dB} - 10\alpha\log_{10}(r) + L_{ex}.$$

The difference in power received by the mobile between two sibling sectors at the same cell site will yield an equation that is mainly dependent upon the difference in the gains of the two sector antennas cancelling out all the common complex radio waves propagation mechanism between transmitting antenna and mobile station. So the sibling pair only based solution reduces system complexity and costs by avoiding sophisticated modeling techniques, GIS database and field data collection requirements. All other parameters cancel in the differencing operation. This is written as:

$$\Delta P_{dB}(\theta) =$$

$$(P_{R1_{dBm}} - P_{T1}) - (P_{R2_{dBm}} - P_{T2}) + 20\log_{10}\left(\frac{f_1}{f_2}\right) = G_{T1_{dB}}(\theta) - G_{T2_{dB}}(\theta).$$

Figure 8:
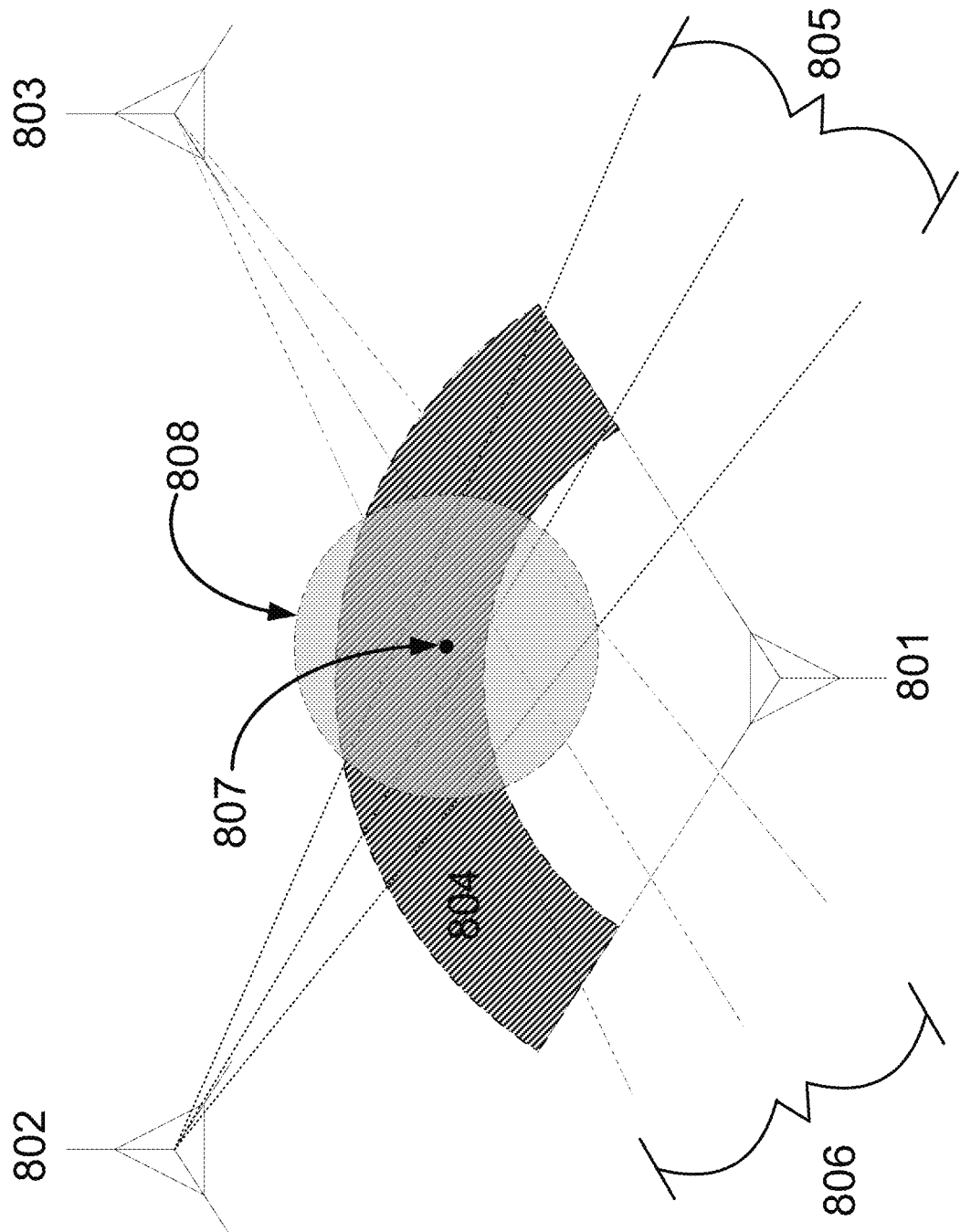
FIG. 8 illustrates spatial responses of the sibling sector antennas lines of constant power differences in forming azimuths.

Therefore, with this model and with knowledge of the spatial responses of the sector antennas, the azimuth angle from the cell site to the unknown mobile position can be estimated. The spatial response can be manufacturer specified or derived based on an empirical model using antenna pattern characteristics such as main beam pointing direction, half power beamwidth (HPBW) and Front-to-back lobe ratio (FBR). Lines in the direction of estimated azimuth angle and the angular uncertainty associated with estimated angle can be drawn from two cell sites as shown in FIG. 8. The powers from these sectors can be measured and their differences taken and compared to the model to find where the two or more lines along the estimated angles from two or more cell sites intersect for a unique location. In case, when a unique intersection point is not found based on the estimated azimuth angle, the common intersection region of two or more angular bands associated with uncertainty from two or more cell sites is used to estimate the mobile location. When the TA information is available for one or more reported serving cells, the common intersection region is further reduced as the overlapped region of TA based angular bands and sibling pair relative RSSI based angular bands to compute the final location estimate, The range of a mobile from its serving cell is typically known by the wireless network because the mobile must be time synchronized to its serving cell to some level for proper operation. Typically, the distance of the mobile from its serving sector is known over a band of ranges because of quantization of the time synchronization. Additionally, for sectored cell sites, the spatial response of the serving sector's antenna will limit the range band over an angular range. This information can be incorporated in the location determining process for increased accuracy and efficiency.

FIG. 8 geographically illustrates this concept where the search for the intersection of the two lines of power differences that best match those measured by the mobile is limited to the range band of the serving sector. In the FIG. 8 scenario, three cell sites 801 802 803, each with three sectors, are shown. Using the beacon signal strengths and identifiers sent by the mobile device, two sets of sibling pairs are found, one pair associated with the first adjacent cell site 802 and one pair associated with the second adjacent cell site 803. The serving cell 801 determines a timing or power-based range shown by the range band 804.

Using the sibling pair technique, lines of constant power difference 805 can be shown from the first adjacent cell site 802. Similarly, lines of constant power difference 806 can be shown from the second adjacent cell site 803.

The overlap between the line of bearings formed by the lines of constant power difference 805 806 and the range band 804 allow for determination of a most likely location 807 and an error range 808.

FIG. 7a

Figure 7A:
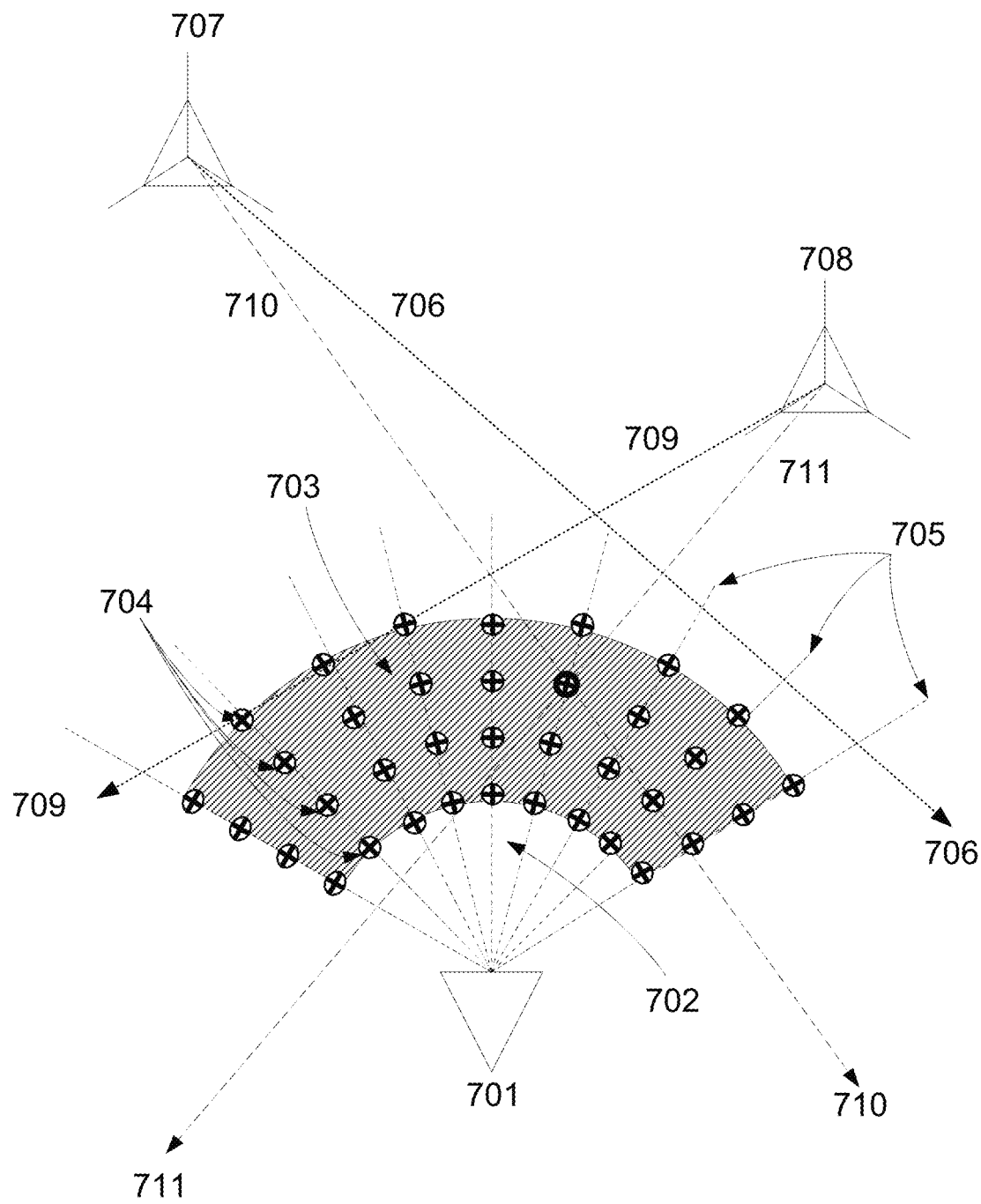
FIG. 7a illustrates a probabilistic time and power-based location determination algorithm geometrically.

FIG. 7a graphically depicts a probabilistic method for power AoA using sibling pairs. A serving cell 701, a first adjacent cell 707 and a second adjacent cell 708 are involved in this location estimation example of the Power AoA or Adjacent Sector technique. The serving cell site 701 has a serving sector 702. The serving sector 702 has a reported (by the mobile) range band 703. The joint area of the serving sector 702 and range band 703 is subdivided radially into 2 or more divisions based on the cell size. On reach radial 705, 1-to-n "pixels" 704 are placed to generate a uniform coverage within the range band 703.

In the FIG. 7a example, two sibling pairs of sector downlink transmit antenna have been discovered at the first 707 and second 708 adjacent cell sites. Using the normalized reported downlink power for each sibling pair, a first 706 and second 709 measured azimuth can be plotted.

Then for each pixel 704, a first 710 and second 711 theoretical azimuth is created for each pixel 704 using the pixel location, the previously determined antenna characteristics, and the normalized reported downlink power. The difference between the first measured azimuth 706 and the first theoretical azimuth 710 is determined for each pixel 704. The difference between the second measured azimuth 709 and the second theoretical azimuth 711 is also then determined for each pixel 704. These differences between the measured and theoretical model allow weighting of the pixel's location as a probability. Pixels showing minimal measured vs. modeled differences are granted a high weight.

Once computation and weighting is concluded, a final location estimate is computed as the weighted average of the K pixels with the smallest geographic differences between the modeled and measured.

FIG. 7b

Figure 7B:
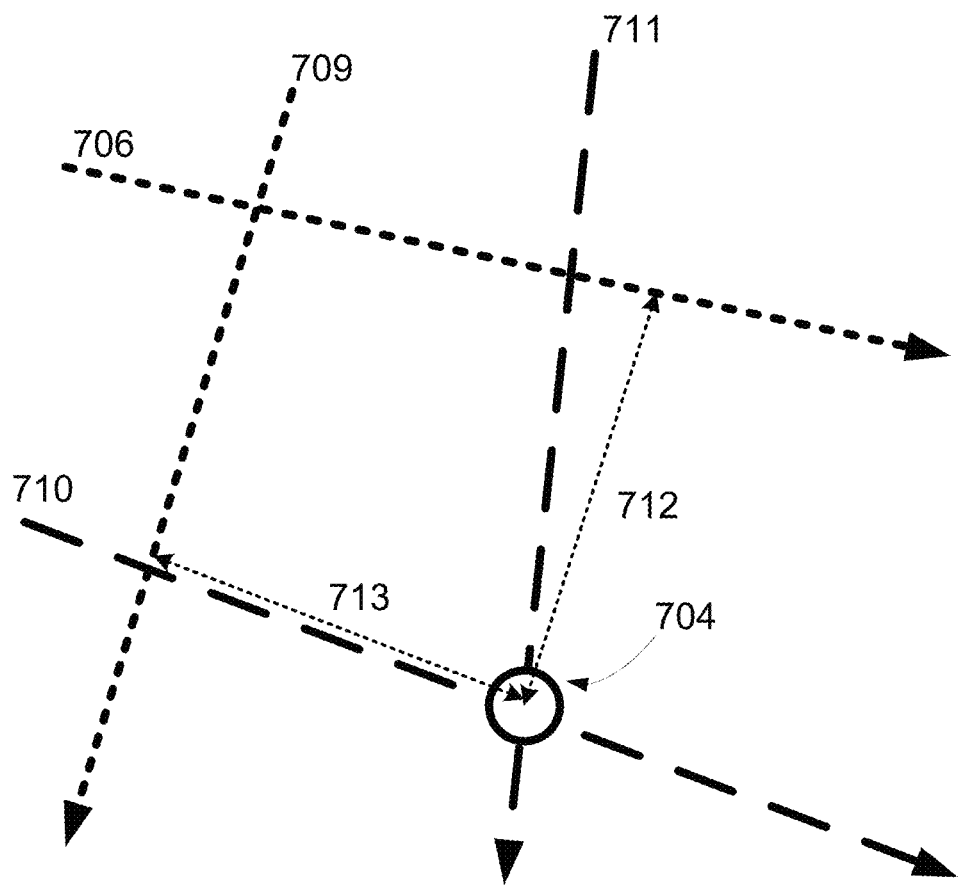
FIG. 7b details geographic differences between the measured and modeled azimuths.

FIG. 7b illustrates geometrically the determination of the differences which generate the probability weighting for a single pixel 704. The first measured 706 and the first modeled 710 azimuth for first adjacent cell 707 are shown. The first modeled azimuth 710 passes through the pixel 704. The difference between the first measured 706 and the first modeled 710 azimuth is shown geographically 712.

If a second sibling pair exists, then the second measured 709 and the second modeled 711 azimuth are shown. The second modeled azimuth 711 passes through the pixel 704. The geographic difference 713 between the second measured 709 and the second modeled 711 azimuth is shown.

Mathematically, a probabilistic approach for geolocation of mobiles using timing (Timing Advance (TA) in GSM) information and power information from the wireless network can be derived by creating a model of the timing advance and power difference between siblings of neighbor cells over the range band. These parameters are assumed to possess a Gaussian distribution with a known variance and a mean value equal to the model, or predicted value. Gaussian like normalized weights are defined as:

$$W = e^{-\frac{(measured-predcited)^2}{2\sigma^2}}$$

for each of the parameters. The weights are evaluated over the range band for all of the parameters. This is accomplished by evaluating the weights at a number of points or "pixels" uniformly distributed about the range band as shown in FIG. 7a. At each "pixel" the weights are combined in some fashion, i.e. multiplied and/or added for a final result at each pixel's location. The final location estimate is computed as the weighted average of the K pixels with the largest effective weights.

The effective weight at each pixel is given as:

$$W = W_{RSSI} * W_{TA} * W_{AZ}.$$

$W_{RSSI}$ represents a weight based on modeled relative RSSI compared to the reported sibling cell sectors relative RSSI, $W_{TA}$ represents a weight based on pixel distance from reported serving cells TA based distance and $W_{AZ}$ represents a weight based on pixel angle from reported primary serving cell's antenna main beam pointing direction, which has least TA value.

The effective weight of cumulative relative power matching error of all the reported cell sites at each pixel is given by one of the following two methods (sum or product of individual weights), $$W_{RSSI} = \prod_{n=1}^{N} W_n * W_{RSSIn} \text{ or } W_{RSSI} = \sum_{n=1}^{N} W_n * W_{RSSIn}$$

$W_{RSSIn}$ represents a normalized Gaussian weight as:

$$W_{RSSIn} = e^{\left(-\frac{(|RP_{meas}-RP_{pred}|-\Delta_{rssi})_n^2}{2\sigma_{rssi}^2}\right)}$$

$RP_{meas}$ is the measured relative power in dB between sibling sectors at cell site n, $RP_{pred}$ is model the mode of the relative power, i.e. the predicted value, in dB between sibling sectors at cell site n at the pixel and $\sigma_{RSSI}^2$ is the known a priori variance of the relative powers over the coverage area. This weight value is only used when the magnitude of the difference between $RP_{meas}$ and $RP_{pred}$ equal is greater than $\Delta_{rssi}$dB. When the magnitude is less than or equal to $\Delta_{rssi}$dB, $W_{RSSIn}$ is set equal to 1.

$W_n$ is a reliability weight of RF modeling as a function of measured RSSI difference and is given by:

$$W_n = e^{\left(-\frac{(|RP_{meas}|-\delta_{meas})_n^2}{2\sigma_g^2}\right)}$$

when the magnitude of the measured relative power in dB at cell site n, i.e. $RP_{meas}$, is greater than $\delta_{meas}$dB. Otherwise, $W_n$ is given a value of 1.

When measurements from one or more serving cell sectors are available, the effective weight at each pixel is calculated over the primary serving cell TA band as follows:

$$W_{TA} = \prod_{s=1}^{S} W_{TAn}.$$

S is the total number of reported serving cells, $W_{TAn}$ is the TA distance error based weight for the nth reported serving cell and is given by the following normal distribution:

$$W_{TAn} = e^{\left(\frac{-(|d_{TA}-d|-\Delta_d)^2}{2\sigma_{TA}^2}\right)}$$

where $d_{TA}$ is the measured TA distance, d is the distance of the pixel, and $\sigma_{TA}^2$ is the known a priori variance. This weight value is only used when the magnitude of the difference between $d_{TA}$ and d is greater than $\Delta_d$. When the magnitude is less than or equal to $\Delta_d$, $W_{TAn}$ is set equal to 1.

The server probability weight as a function of azimuth angle from the bore site direction is given by:

$$W_{AZ} = \begin{cases} 1 & \text{for, } \theta \leq HBW \\ \left(\frac{[0.5+0.5\cos(\theta)]}{[0.5+0.5\cos(HBW)]}\right)^4 & \text{for, } |\theta| \geq HBW \end{cases}$$

Again, the effective weight for a pixel is the product of the above three weights.

The final step of the location estimation involves sorting weights for all of pixels from largest to smallest and then choosing the K largest ones within some pre-defined percentage of the maximum weight and calculating a location that is the weighted sum of the pixel locations associated with these K weights. Mathematically, this is written as:

$$x_{est} = \frac{\sum_{i=1}^{K} W_i x_i}{\sum_{i=1}^{K} W_i} \text{ and } y_{est} = \frac{\sum_{i=1}^{K} W_i y_i}{\sum_{i=1}^{K} W_i}$$

Illustrative Embodiments

1. Power AoA with 3-Sectored Serving and Adjacent Site(s)

Figure 2:
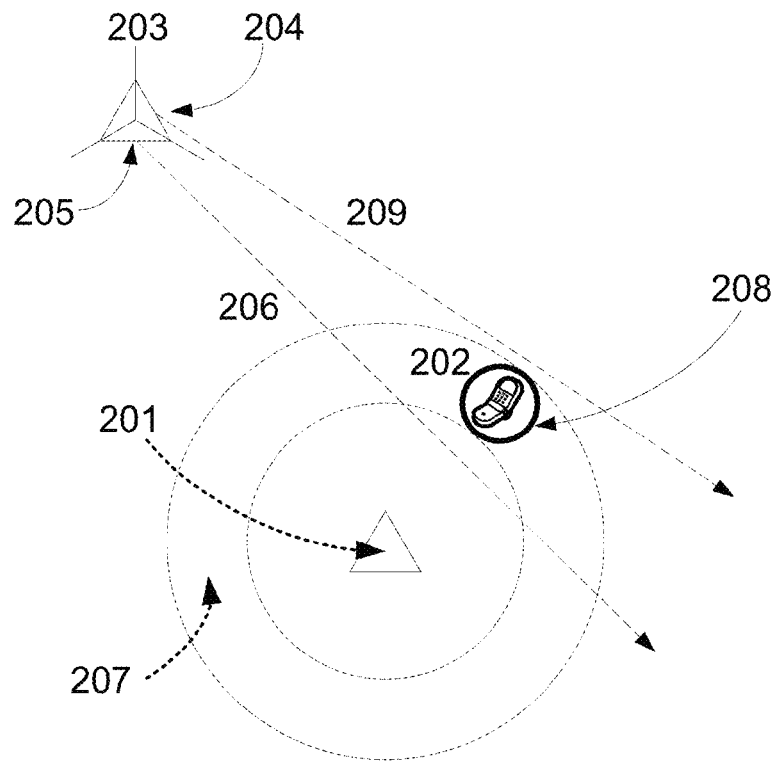
FIG. 2 graphically depicts a location scenario for a single sibling pair in an adjacent cell site.

In FIG. 2, the location of a mobile device 202 using information from an omni-directional serving cell 201 and a neighboring sectored cell 203 is shown. The serving cell site 201 has a single serving sector (a CGI in GSM terminology or PCI in LTE) with a range band 207. The size and width of range band 207 is based on the value of the Timing Advance (TA) and the precision of the Timing Advance value (a TA width is 554 meters in GSM and 156 meters in LTE). The mobile device (e.g., an MS or UE) 202 must be active to allow production of measurement reports, but can be in a control channel transaction or traffic channel transaction while active. The active MS/UE 202 has a bidirectional radio link with the serving cell 201 and periodically scans and receives the beacon broadcasts from the sectors 204 205 of the adjacent cell 203.

Using the normalized received power and antenna models, bearing angles 206 209 corresponding to a standard deviation on either side of the mean bearing angle estimate originating from each sector 204 205 transmit antenna can be calculated. By combining the angle information standard deviations 206 209 and the range band 207, a location estimate 208 for the mobile device can be calculated. This location estimate 208 is superior in accuracy as compared to a conventional cell-ID based location in an omnidirectional cell (the latitude and longitude of the serving cell 201). The estimated location error here can be calculated as the area encompassed by the range band 207 and the standard deviation of the bearing angles 206 209.

2. Power AoA with Omnidirectional Serving and Sectored Adjacent Site(s)

Figure 3:
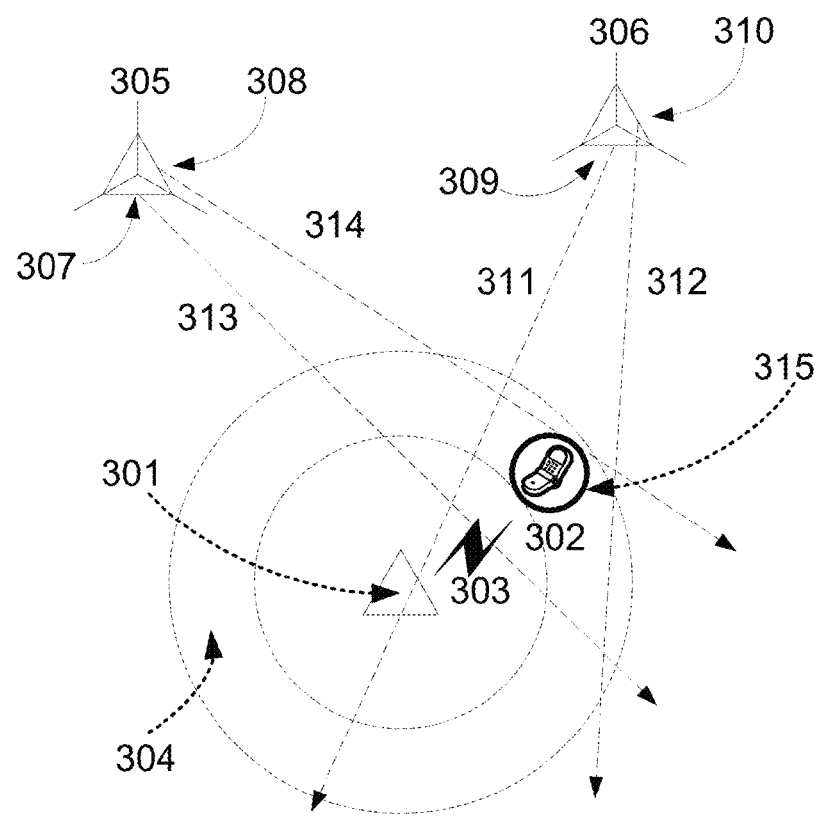
FIG. 3 graphically depicts a location scenario for when two sibling pairs exist in two adjacent cell sites.

In FIG. 3, the location of a mobile device 302 using an omni-directional serving site 301 and 3-sectored adjacent cell sites 305 306 is shown. In the serving cell/sector 301, a range band 304 is shown based on the value of the Timing Advance and the precision of the Timing Advance value. The mobile device 302 must be active to allow production of measurement reports, but can be in a control channel transaction or traffic channel transaction while active. The active MS/UE 302 has a bidirectional radio link 303 with the serving cell 301 and periodically scans and receives the beacon broadcasts from sectors 307 308 of cell 305 and from sectors 309 310 from cell 306.

Using the normalized receive power and antenna models, a set of bearing angles 311 312 313 314 corresponding to the standard deviation of the bearing angle estimates can be plotted for each reported sector 309 310 307 308 transmit antenna. By combining the angle information from bearing angles 311 312 313 314 and the serving cell 301 range band 304, a location estimate 315 for the mobile device can be calculated. This location estimate 315 is superior in accuracy as compared to a conventional cell-ID based location in an omnidirectional cell (the latitude and longitude of the serving cell 301). The estimated location error here can be calculated as the area encompassed by the range band 304 and the standard deviations of the bearing estimates 311 312 313 314.

3. Power AoA with Two Nearby Sectored Sites

Figure 4:
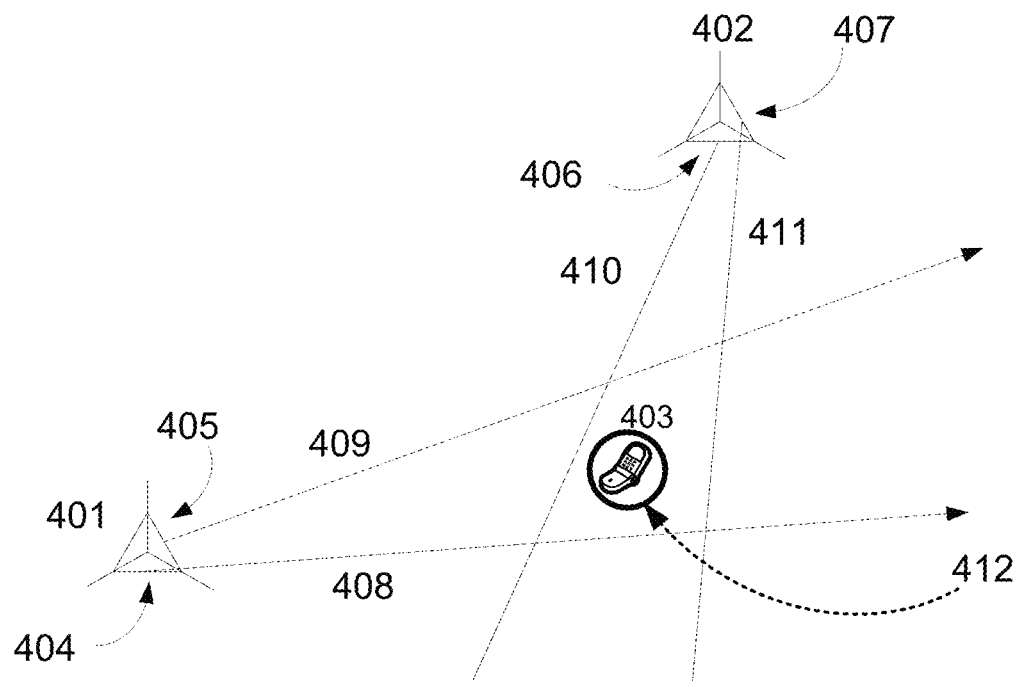
FIG. 4 illustrates graphically depicts a location scenario for when two sibling pairs exist in two adjacent cell sites and no timing range from the serving cell is available.

In FIG. 4, the location of a mobile device 403 using nearby sectored cell sites 401 402 is shown. In this scenario, no serving cell power or timing range band is needed. The mobile device 403 need not be registered, active, or engaged in duplex communications with the wireless system providing the downlink beacons.

The mobile device 403 scans and receives the downlink beacon broadcasts from the sectors 404 405 of cell 401 and from sectors 406 407 from cell 407. Using the normalized receive power and antenna models, a set of bearing angles 408 409 410 411 corresponding to the standard deviation of the bearing angle estimates can be plotted for each received sector 404 405 406 407 transmit antenna. By combining the angle information from bearing angles 408 409 410 411, a location 412 for the mobile device 403 can be calculated. The information needed for calculation of the mobile location 412 (the transmission antenna broadcast power, the antenna models, and the location of each downlink transmission antenna) may be broadcast by the wireless network, recorded locally on the mobile device 403, or received from an alternative radio network. In some scenarios, the mobile device 403 may collect the downlink signals and transmit over alternative means to a landside server for location calculation.

4. Power AoA with Three Nearby Sectored Sites

Figure 5:
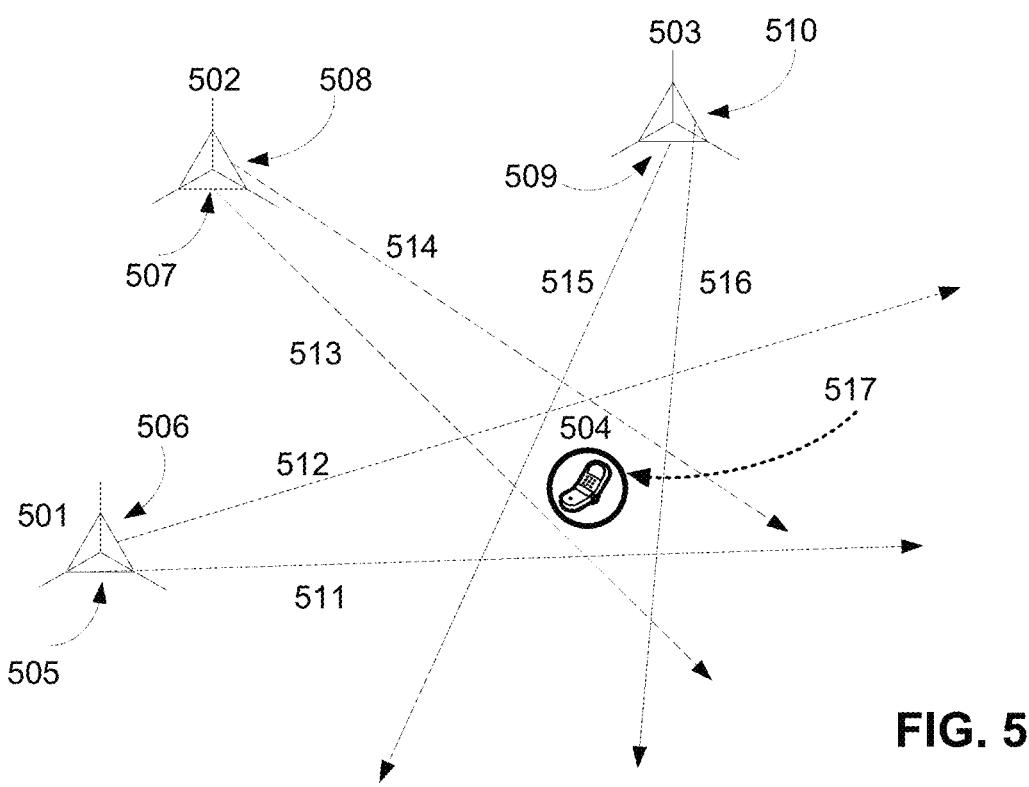
FIG. 5 illustrates graphically depicts a location scenario for when three sibling pairs exist in three cell sites and no timing range from the serving cell is available.

In FIG. 5, the location of a mobile device 504 using nearby sectored cell sites 501 502 503 is shown. In this scenario, no serving cell power or timing range band is needed. The mobile device 504 need not be registered, active, or engaged in duplex communications with the wireless system providing the downlink beacons.

The mobile device 504 scans and receives the downlink beacon broadcasts from sectors 505 506 of cell 501, sectors 507 508 of cell 502, and sectors 509 510 of cell 503. Using the normalized receive power and antenna models, a set of bearing angles 511 512 513 514 515 516 corresponding to the standard deviation of the bearing angle estimates can be plotted for each received sector 505 506 507 508 509 510 transmit antenna. By combining the angle information from bearing angles 511 512 513 514 515 516, a location 517 for the mobile device 504 can be calculated. The information needed for calculation of the mobile location 517 (the transmission antenna broadcast power, the antenna models, and the location of each downlink transmission antenna) may be broadcast by the wireless network, recorded locally on the mobile device 517, or received from an alternative radio network. In some scenarios, the mobile device 504 may collect the downlink signals and transmit over alternative means to a landside server for location calculation.

FIG. 6

Figure 6:
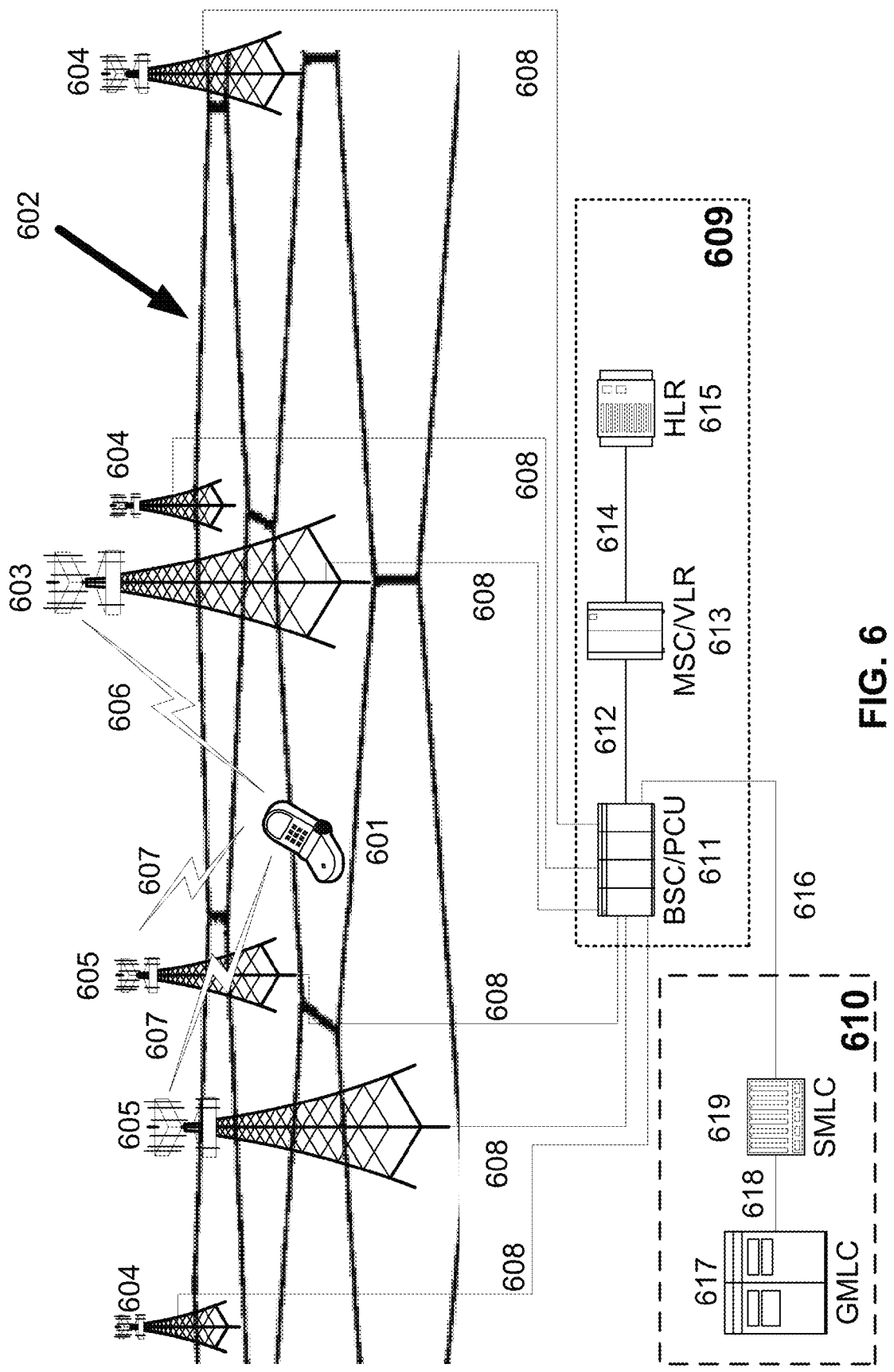
FIG. 6 graphically depicts a mobile-based collection of downlink signals in a radio access network.

FIG. 6 depicts a Wireless Communications Network (WCN) for voice and data communications. The WCN is comprised of the Radio Access Network (RAN) 602 and the Core Network 609. A Wireless Location System (WLS) 610 is deployed to support location services.

The RAN 602 is comprised of a distributed network of radio transceiver stations and antennae (RTS). Also known as Base Transceiver Stations, Radio Base Stations, Base Stations, NodeB's and Enhanced NodeB's, the RTS 603 604 605 come in a variety of different sizes, providing differing coverage areas and load capabilities. In this example the RTS are further described by their roles and proximity with respect to the mobile station/User Equipment (MS/UE) 601. The serving RTS 603 establishes and maintains the radio link 606 with the MS/UE 601. The adjacent RTSs 605 and proximate RTSs 604 are potential handover candidates and the radio broadcast beacons from each RTS may be scanned by the MS/UE 601 in accordance with the beacon allocation list present in the serving RTS 603 downlink beacon.

Each RTS 603 604 605 connects with the core network 609 via a wired or wireless data link 608. In a GSM system, BTS are interconnected to a Base Station Controller (BSC)/Packet Control Unit (PCU) while in an LTE system, the eNodeB are interconnected to a Mobility Management Entity (MME).

In the GSM example, the BTS 603 604 605 are connected to the BSC/PCU 611 by the Abis interface 609. The BSC/PCU 611 connects to the Mobile Switching Center (MSC) 613 via the A interface 612. The MSC typically also serves as the Visitor Location Register (VLR) where subscriber profiles from the HLR 615 are downloaded via the SS7 network 614 as needed.

In an LTE network, the Core Network 609 is replaced by the System Architecture Evolution (SAE) which takes advantage of the all-internet protocol (IP) packet routing area networks and increased microprocessor performance to create a cheaper, scalable core network. The four main components (not shown in the FIG. 6 example) of the SAE are the Mobility Management Entity (MME), Serving Gateway (SGW), the PDN Gateway (PGW), and the Policy and Charging Rules Function (PCRF).

A Wireless Location System 610 for GSM is shown. The Serving Mobile Location Center (SMLC) 619 interconnects with the BSC/PCU 611 via the 3GPP-defined Lb interface 616. The SMLC in turn interconnects (normally via intermediary interfaces and nodes) to the Gateway Mobile Location Center GMLC 617 via the Lg interface 618.

Not shown in this example illustration is the WLS for an LTE network. The LTE WLS is comprised of the E-SMLC (Evolved SMLC for LTE) which connects to the MME as described in 3GPP Technical Specification 36.305 v9.3, "Stage 2 functional specification of User Equipment (UE) positioning in E-UTRAN".

Alternative Embodiments

User Plane

A user-plane approach (where the handset and a landside server interact with the WCN transparently providing a data connection) to the present invention is possible using the Subscriber Identity Module (SIM) toolkit (STK). The STK was originally defined in the European Telecommunications Standards Institute (ETSI) GSM 11.14 Technical Standard (TS) 11.14, "*Specification of the SIM Application Toolkit (SAT) for the Subscriber Identity Module—Mobile Equipment (SIM-ME) interface.*" An updated toolkit standard for the GSM, UMTS, and LTE networks and the Universal Subscriber Identity Module (USIM) can be found in the $3^{rd}$ Generation Partnership Program (3GPP) TS 31.111 "*Universal Subscriber Identity Module (USIM) Application Toolkit (USAT).*" The STK defined command set allows direct access of the MS/UE network, timing and power measurements by a landside server. Using the STK, the SMLC can request the network measurements without interaction with the WCN control nodes.

LMU-assisted System

Location Measurement Units (LMUs) are radio receivers typically co-located with the wireless network's base stations normally installed to facilitate uplink time-difference-of-arrival (U-TDOA) and/or angle-of-arrival (AoA) location techniques. The primary advantage of using an LMU based system with Power AoA location is the ability of an LMU to measure the received downlink beacon identifiers and signal strengths from surrounding sectors resulting in an overlay system that, when coupled with the SIM toolkit, provide location services outside the control of the wireless communications system operator. The combination of U-TDOA with ECID for calibration of the ECID location was previously taught in U.S. application Ser. No. 11/736,950, filed Apr. 18, 2007, "Sparsed U-TDOA Wireless Location Networks."

Method of Selecting Appropriate Location Estimate Solution

A wireless device location estimate solution (LES) comprises a means to provide the probable location estimate and the associated uncertainty region around the location estimate for a specified confidence level of location estimate being within the uncertainty region. Herein is presented a fall-forward method of selecting an appropriate wireless device location estimate solution depending on the available input information such as number of cells with valid cell identifiers, cell type such as serving or neighbor cell, number of cells with valid time value, number of cells with valid power value and number of sibling pairs with valid power values in the input NMR (Network Measurement Report) data collected over a pre-defined period of time. The term NMR is used inclusively and encompasses technology dependent measurement reports examples include the CDMA system's Reported Pilot Level (RPL) measurement, the UMTS Measurement Report and LTE system's Measurement Report, Each cell sector in the cellular network can be assigned with a unique numeric identifier associated with a combination of broadcast control channel [for example: BCCH (Broadcast Control Channel) in GSM, uARFCN (UMTS Terrestrial Radio Access Absolute RF Channel Number) in UMTS or LTE] and base station identification code [for example: BSIC (Base Station Identity Code) in GSM, pSC (Pilot scrambling code) in UMTS or LTE] which are presented for the serving or neighbor cells in MR/NMR (Measurement Report/Network Measurement Report) data reported by mobile station back to the network. The network measured timing (for example: TA (Timing Advance) in GSM or LTE, Pd (Propagation delay) or RTT (Round-Trip-Time) in UMTS) information and/or the mobile station measured power [for example: RSSI (Received Signal Strength Indicator) in GSM, RSCP (Received Signal Code Power) in UMTS, RSRP (Reference Signal Received Power) in LTE] are available for each of the reported cells in the input NMR data. The primary cell is defined as the cell closest to the MS with least timing information value, when one or more reported cells have timing values or strongest power value, when none of the cells have reported timing information, but have reported power values.

Various location estimate solutions applicable for different input NMR data information are presented to provide a location estimate based on a closed form approximate solution to a more accurate detailed solution based on a sophisticated radio propagation prediction model with low prediction errors and cellular network functionality concepts of defining a serving area for a serving cell and neighbor area for a neighbor or a potential handover cell. The shape of various geographic areas representing the timing based distance range band, power based distance range band, serving and neighbor areas could be defined by approximate closed form equations or a set of well-known shapes such as a circle or rectangle enclosing a complex shape of the geographic areas based on a sophisticated radio propagation prediction modeling.

The uncertainty region specification along with the location estimate is equally important to understand the error associated with the probable location estimate. The probable search area where the mobile may be located could be derived using different location estimation techniques presented in subsequent sections based on the available input information. The most probable location estimate could be computed as the weighted average of all or part of this search area based on the associated weights and the corresponding uncertainty region will be defined accordingly based on the quality as well as the combination of available input information for a specified confidence level of being the location estimate inside the provided uncertainty region.

Since the range of the available input information in NMR data is limited to be within certain known limits, each location solution could have an offline generated ready to use mapping table of available input information associated with the corresponding location estimate as well as the uncertainty region specification. This approach can able to achieve high location throughput yet keeping the real time system simple to meet the demands of various accuracy requirements as well as the complexity and cost of the associated deployment and maintenance.

For example when the flat file based proprietary location solution database is used, just the knowledge of the primary cell, its timing or power information and the solution type to be used limits the searching of database only to match the remaining input information against the contents of a specific file tagged with the solution type, primary cell identifier and the associated timing or power value. The contents of this file include all the possible combinations of other input information for the reported cells. In this way, location solution could be provided quickly even for a large sized cellular network of tens of thousands of cell sites to achieve higher throughput yet keeping real time system simple by separating the underlying location technology and maintenance.

FIG. 11

Figure 11:
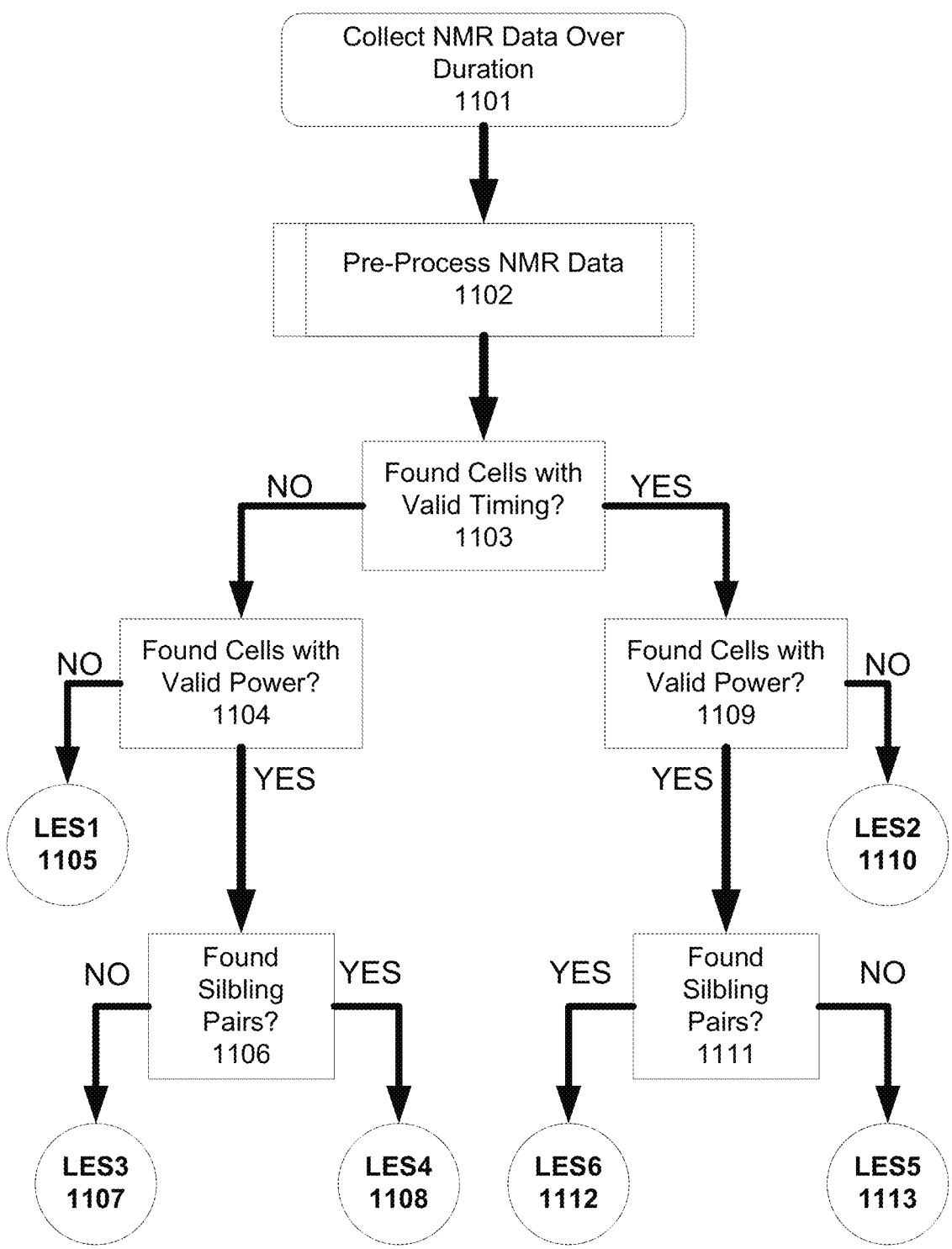
FIG. 11 sequentially shows a solution flow for the fall-forward technique for localization.

A high level overview of the appropriate location estimate solution selection process based on the available input information is shown in FIG. 11. Using the fall-forward method, the database containing cell-level parameters (e.g. cell-ID, cell service areas, neighbor lists) is already established in the SMLC or location server. The mobile collects NMR data in the normal course of operations and this data is sent to the Wireless Communications Network (WCN) over the air interface. The NMR data is collected by the Wireless Location System (WLS) over duration 1101. This duration will vary according to the radio air interface technology and the WCN settings. The NMR data collected will then be pre-processed 1102 against the databased cell site and network information. Validity of the collected data will be ascertained by its correspondence to the possible ranges or values held in the databased information.

If in the collected NMR data, cells are found with valid timing 1103 (that is within the limitations established from the databased cell site and network information), then a test for cells with valid power is performed 1109. If no valid power measurements are found in the collected NMR data, then scenario LES2 1110 (LES2: When only cell Identifier and time information is available) is activated. If instead valid power measurements are found in the collected NMR data, then a check for sibling pairs is performed 1111. If sibling pair(s) are found, then then scenario LES6 1112 (LES6: When cell Identifier, time and/or power information is available for one or more serving and neighbor cells with one or more sibling pairs) is activated. If no sibling pair(s) are found in the collected NMR data, then scenario LESS 1113 (LESS: When cell Identifier, time and/or power information is available for one or more serving and/or neighbor cells without any sibling pair) is activated.

If the collected NMR data, when tested for cells with valid timing 1103, does not contain valid timing measurements, then that NMR data is tested for valid power measurements 1104. If no valid power measurements are found, the scenario LES1 1105 (LES): When only cell Identifier information is available) is activated. If instead valid power measurements are found in the collected NMR data, then a check for sibling pairs is performed 1106. If sibling pair(s) are found, then then scenario LES4 1108 (LES4: When cell Identifier and power information is available for two or more serving and/or neighbor cells with one or more sibling pairs) is activated. If no sibling pair(s) are found in the collected NMR data, then scenario LES3 1107 (LES3: When only cell Identifiers and power information is available for one or more serving and/or neighbor cells without any sibling pair) is activated.

The details of each scenario 1-6 introduced in FIG. 11 are described in the subsequent sections. Depending on the complexity level of the solution and throughput requirements, it can be computed in real time or just use the readily available mapping table generated and maintained offline. The Universal Geographical Area Description (as defined in 3GPP Technical Specification No. 23.032; "Universal Geographical Area Description (GAD)" is used to describe all reported location estimates and error areas. In many low-accuracy location techniques, the reported location is the merely the center or centroid of an area of equal location probability.

1) LES1: When Only Cell Identifier Information is Available

When only one or more cell identifiers are reported during the period of NMR data collection time, a location estimation method is presented, which could be better than or equal to the standard available CID solution, which reports the cell site location of the primary serving cell.

When a single serving cell identifier is only reported the location estimate is computed as the centroid of serving cell's serving geographic area.

When two or more serving cell identifiers are only reported, the location estimate is computed as the centroid of the common region with highest number of overlapping of the serving geographic areas of the reported serving cells. For example, when three serving cells are reported and no common region is found among the serving areas of all three serving cells, then the common region overlapping with the serving areas of only two serving cells is selected instead.

When one or more neighbor cell identifiers are only reported without any serving cell information, the location estimate is computed as the centroid of the common region with highest number of overlapping of the neighbor geographic areas of the reported neighbor cells.

When one or more neighbor cells are reported in addition to one or more serving cells, the location estimate is computed as the centroid of the common region of various serving geographic areas of the reported serving cells with highest number of cells overlapping and is further biased towards the direction of the centroid of the maximum overlapping of neighbor geographic areas of the additional reported neighbor cells. The location estimate for the single or multiple reported serving cell identifier combinations availability over the NMR data collection time could be computed in real time or loaded from a pre-established location mapping table database created and maintained offline for each individual serving cell or multiple serving cells combinations within a specific location service area (LSA).

FIG. 12

Figure 12:
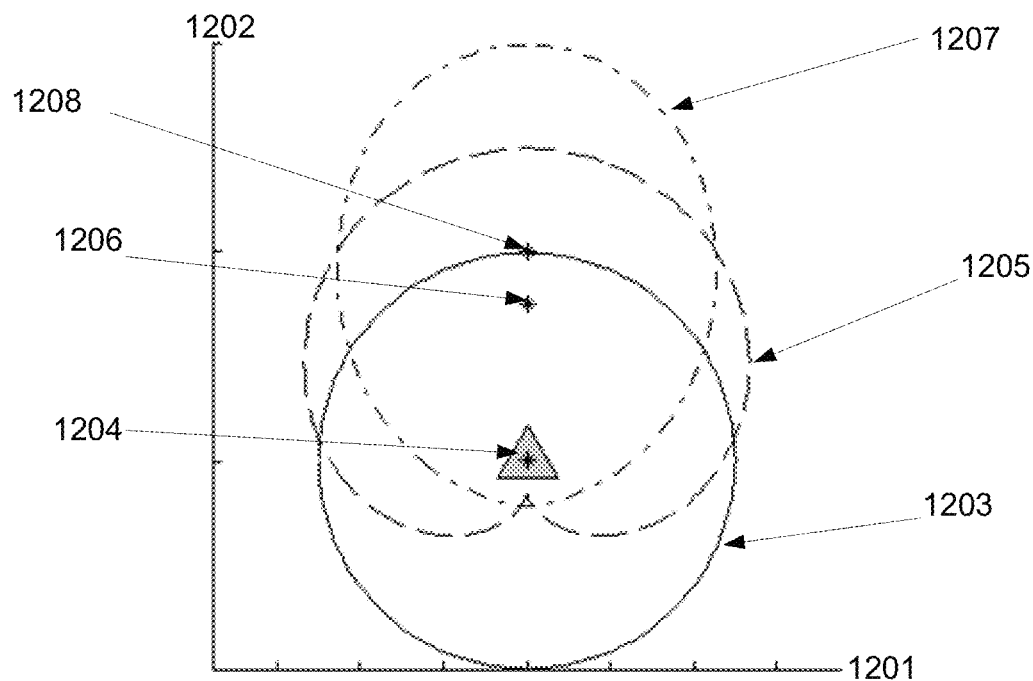
FIG. 12 graphically depicts location estimation based on the service area of a cell-ID.

FIG. 12 graphically depicts location estimation based on the service area of a cell-ID. A latitude 1201 and longitude 1202 map is used to help depict cell-ID location. For an omnidirectional cell centered on the base station antenna 1204, the reported location is that of the base station antenna 1204 with an error probability equal to the service area 1203. For a 120 degree (3-sectored) cell using a directional base station antenna, the reported location 1206 is placed at the center of mass of the service area 1205. For a 60 degree (6-sectored) cell using a directional base station antenna, the reported location 1208 is placed at the center of mass of the service area 1207.

Improvements, based on the acquisition and use of historical location data, can be used to modify the reported location and location error as described in U.S. patent application Ser. No. 12/870,564; "Location Accuracy Improvement Using a priori Probabilities"

FIG. 13

Figure 13:
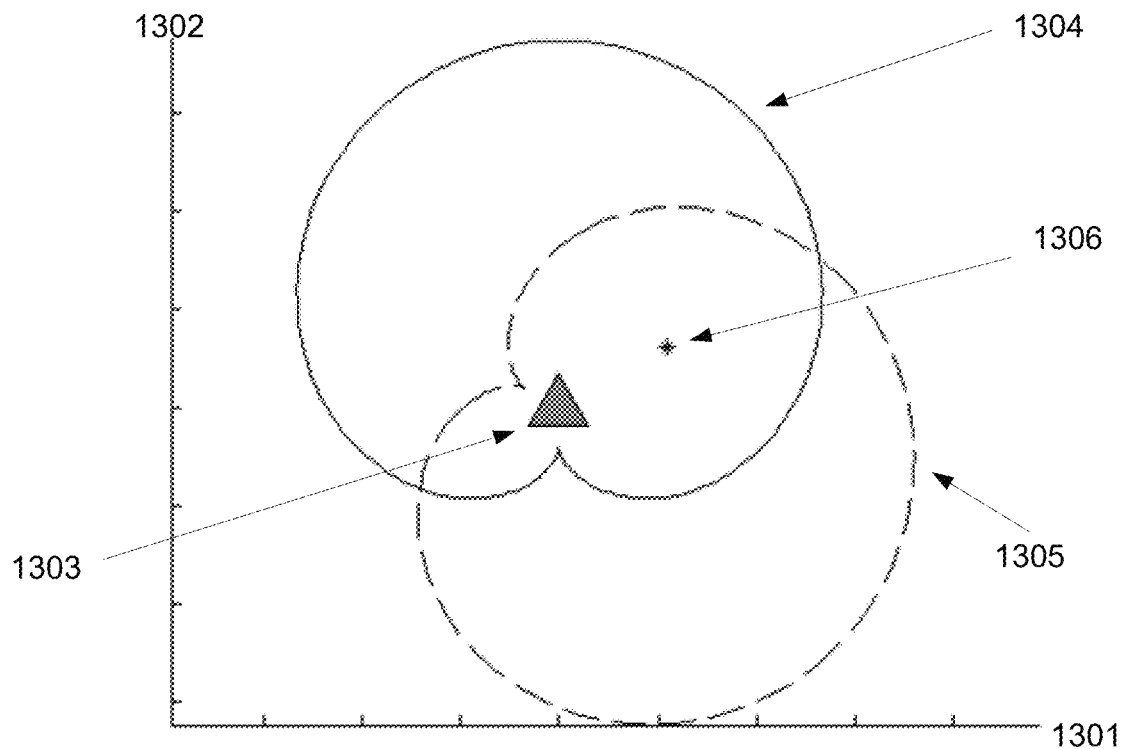
FIG. 13 graphically depicts location estimation based neighbor area of two sibling cells.

FIG. 13 graphically depicts location estimation based neighbor area of two sibling cells. Plotted on a latitude 1301 and longitude map, the sibling cells are each sectors on the same base station 1303. The serving sector's service area 1304 and the neighboring sector's service area 1305 are used to determine the location estimate 1306 and error area based on the overlap between service areas.

FIG. 14

Figure 14:
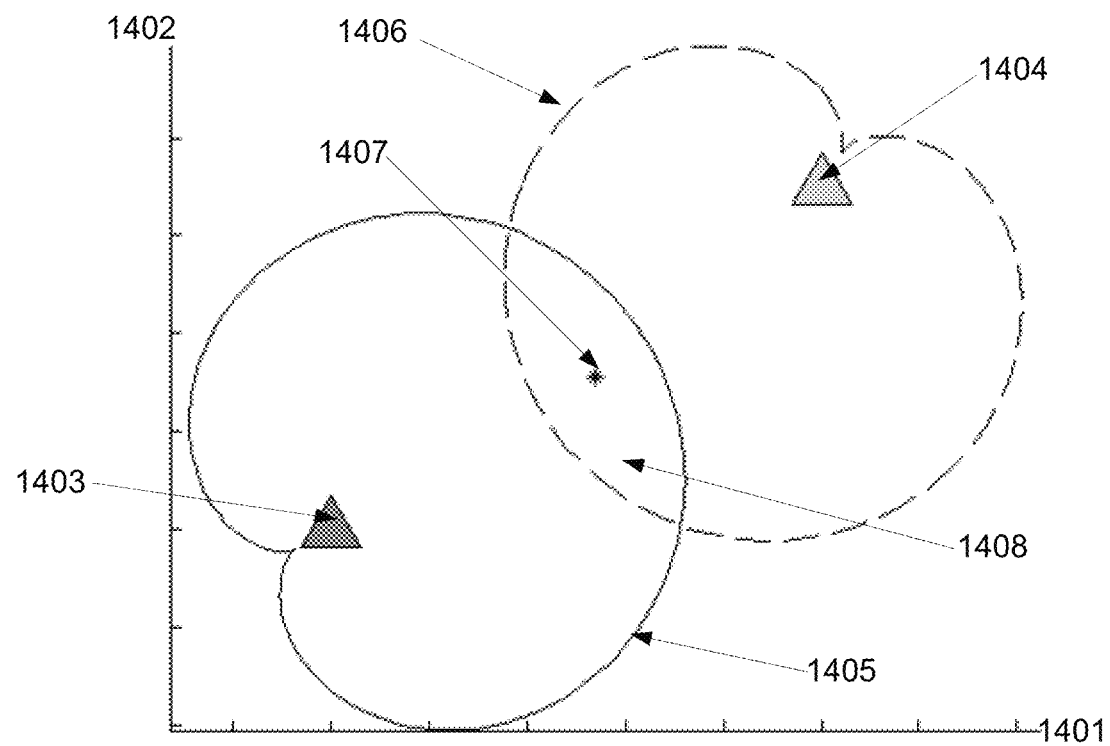
FIG. 14 graphically depicts location estimation based on the neighbor area of two non-sibling cells.

FIG. 14 graphically depicts location estimation based on the neighbor area of two non-sibling cells. Shown on the latitude 1401 and longitude 1402 map, the serving and neighbor cells (shown as sectors in this example) are based on two different base stations 1403 1404. The service area of the serving cell 1405 and the service area of the neighbor cell 1406 overlap. The center of area 1407 of the overlap area 1408 is reported as the estimated location while the dimensions of the overlap area 1408 are used to describe the error area.

FIG. 15

Figure 15:
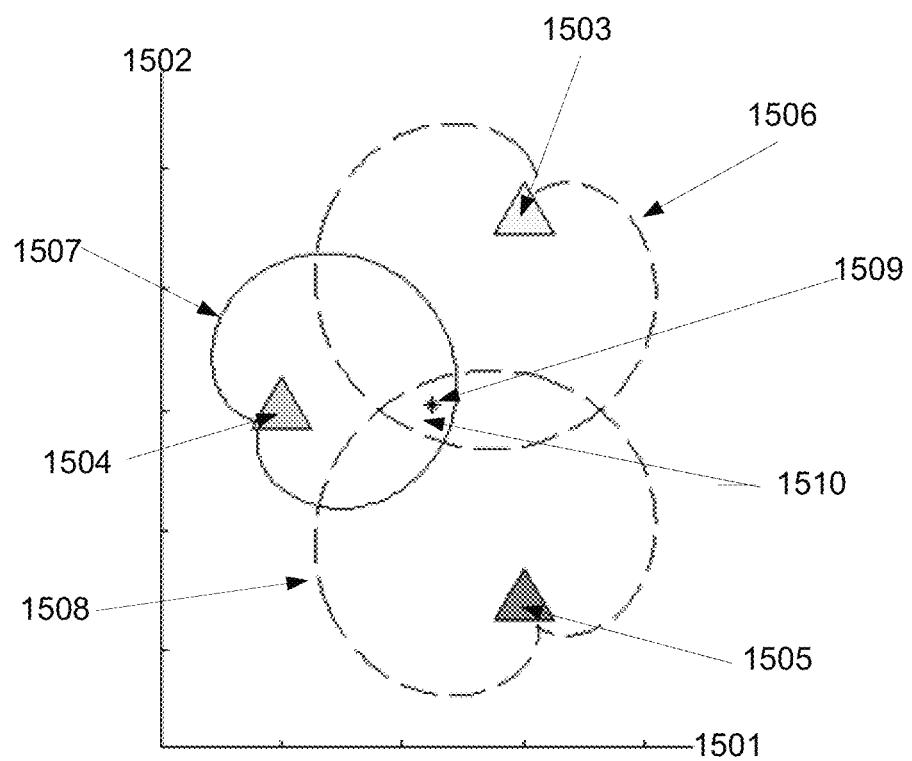
FIG. 15 graphically depicts location estimation based on the neighbor area of three cells with common region.

FIG. 15 graphically depicts location estimation based on the neighbor area of three cells with common region. As shown on the Latitude 1501 and Longitude 1502 plot, three base stations 1503 1504 1505 have a cells with service areas 1506 1507 1508 that all overlap. The centroid 1509 of the overlapping area 1510 is reported as the location estimate and the geographical area description of the overlapping area 1510 is reported as the error estimate.

FIG. 16

Figure 16:
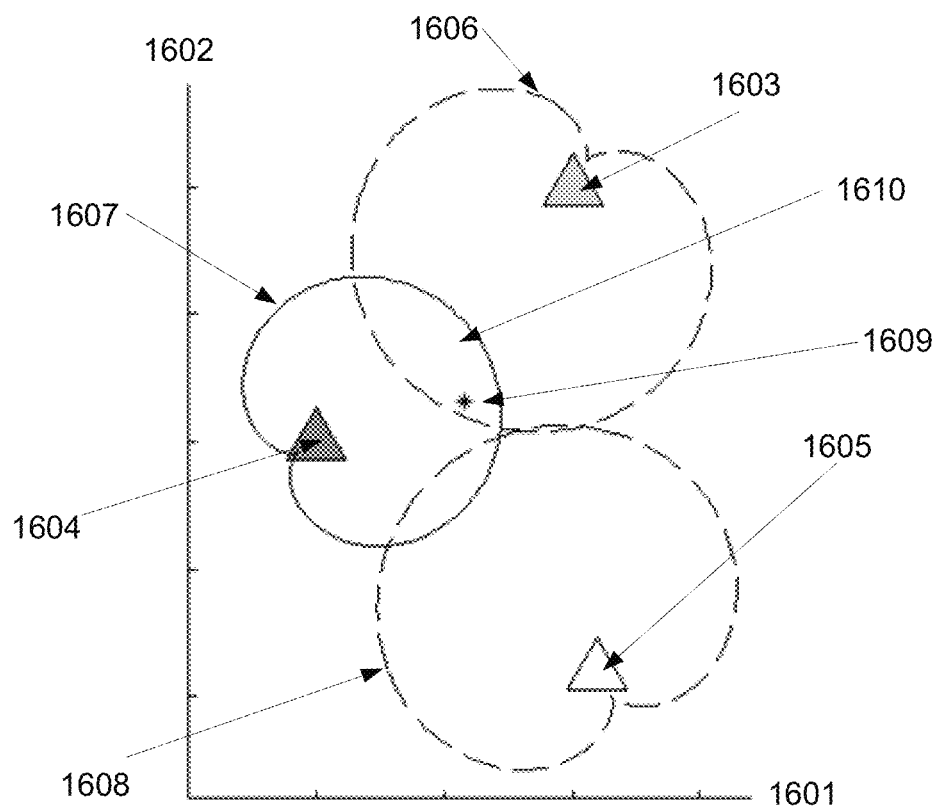
FIG. 16 graphically depicts location estimation based on the neighbor area of three cells without common region.

FIG. 16 graphically depicts location estimation based on the neighbor areas of three cells without a single/common, overlapping service area. In this example, plotted on a latitude 1601 and longitude 1602 map, three base stations 1603 1604 1605 are sectorized. The service areas 1606 1607 1608 do not share a common overlap area, however; two service areas 1606 1607 do overlap creating a partially common service area 1610. Rather than discard the information gleaned from the existence of the non-included service area 1608, the reported location estimate 1609 is offset from the center of the partially common area 1610 in direction of the non-included service area 1608 basestation 1605. The offset is determined from the relative power received from basestation 1605 versus those of the other base stations 1603 1604.

2) LES2: When Only Cell Identifier and Time Information is Available

When one or more serving cells with valid timing information are reported during the period of NMR data collection time, a location estimation method is presented, which could be better than or equal to the standard available Cell ID+Timing Range (e.g. CGI+TA in GSM) location of the primary serving cell. The primary serving cell is the closest cell to the MS with the least timing information value, when one or more serving cells report timing values.

A distance estimate along with the associated range uncertainty from a reported serving cell site location can be computed from the network measured timing information. The distance range estimate for each timing value could be defined by a simple closed form equation or a set of well-known shapes such as a circle or rectangle enclosing the complex shape of the geographic distance range area based on a sophisticated radio propagation prediction modeling.

When timing information for a single serving cell is reported during a period of NMR data collection time, the location estimate is computed as the centroid of the serving cell sector's timing based range band along radial direction over associated range uncertainty and along angular direction within the serving area of the serving cell.

When timing information for two or more serving cells are reported over a period of NMR data collection time, the location estimate is computed as the centroid of the common region of various serving cell sector's timing based range bands along radial direction over associated range uncertainty and along angular direction within the serving areas of the reported serving cells. Final location estimate is restricted to be within the primary serving cell's distance range band along the direction of common region's centroid from the primary serving cell location.

When one or more serving cell identifiers are also reported without any timing information in addition to one or more serving cells with valid timing information, the location estimate is computed as the centroid of the timing information based common region and further biased towards the direction of the maximum overlapping of server geographic areas of the additional reported serving cells. Final location estimate is restricted to be within the primary serving cell's distance range band along the direction of the previous best location estimate from the primary serving cell location.

When one or more neighbor cell identifiers are reported without any power information in addition to one or more serving cells with timing information, the location estimate is computed as the centroid of the timing information based common region and biased further towards the direction of the maximum overlapping of neighbor geographic areas of the additional reported neighbor cells. Final location estimate is restricted to be within the primary serving cell's distance range band along the direction of the previous best location estimate from the primary serving cell location.

The location estimate for the single or multiple reported serving cells timing and power availability combinations availability over the NMR data collection time could be computed in real time or loaded from a pre-established location mapping table database created and maintained offline for each individual serving cell or multiple serving cells combinations within a specific location service area (LSA).

FIG. 17

Figure 17:
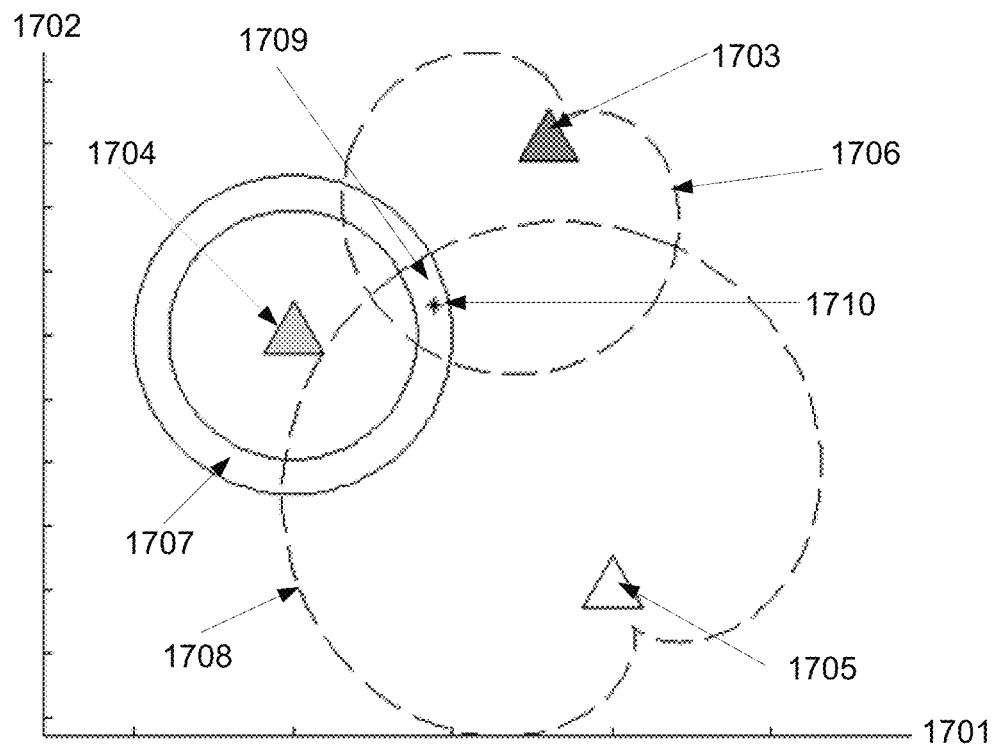
FIG. 17 graphically depicts location estimation based on a combination of timing range and service areas from 3 cells.

FIG. 17 graphically depicts location estimation based on a combination of timing range and service areas from 3 cells. As shown on the latitude 1701 longitude 1702 map, in this example the three base stations 1703 1704 1705 have a common area 1709. In this example the common area 1709 is constrained by the serving areas of cells 1706 1708 and that of a timing range band 1707. The reported location estimate 1710 is calculated as the centroid of the common area and the error area estimate is reported using area and shape of the common area 1710.

FIG. 18

Figure 18:
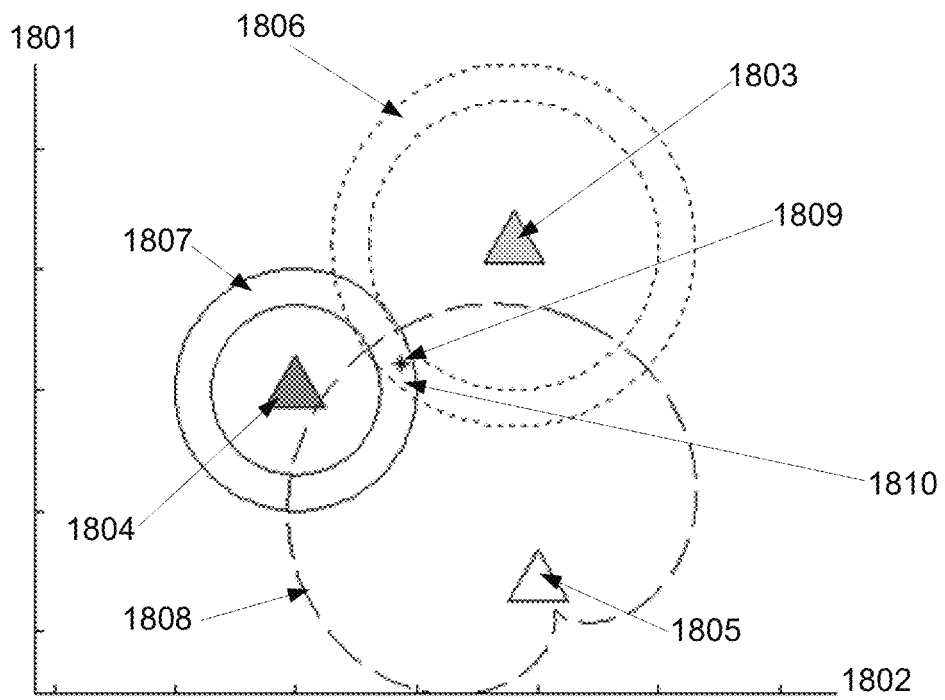
FIG. 18 graphically depicts location estimation based on a combination of timing ranges and service areas from 3 cells.

FIG. 18 graphically depicts location estimation based on a combination of timing ranges and service areas from 3 cells over a region defined by latitude 1801 and longitude 1802. As shown in this example, timing range information is available from two base stations 1803 1804 while at least a third base station's 1805 beacon and thus service area 1808 is acquired. A common area 1810 is formed by the intersection of the two range bands 1806 1807 and the service area 1808. The reported location estimate 1809 is calculated as the centroid of the common area 1810 and the error area estimate is reported as the dimensions of the common area 1810.

3) LES3: When Only Cell Identifiers and Power Information is Available for One or More Serving and/or Neighbor Cells Without Any Sibling Pair Distance estimate along with the associated range uncertainty from a reported serving or neighbor cell site location can be computed from the mobile measured power information normalized to its effective radiated power (ERP) by using the path loss model. The distance range estimate for each power value could be defined by a closed form equation or a set of well-known shapes such as a circle or rectangle enclosing the complex shape of the geographic distance range area based on a sophisticated radio propagation prediction modeling.

When only power information for one or more serving cells is reported during a period of NMR data collection time, the location estimate is computed as the centroid of the region with highest number of overlapping of various serving cells serving areas and the reported power based range bands along the radial direction over associated range uncertainty.

When only power information for one or more neighbor cells is reported during a period of NMR data collection time, the location estimate is computed as the centroid of the region with highest number of overlapping of various neighbor cells neighbor areas and the reported power based range bands along radial direction over associated range uncertainty.

When power information for two or more serving and/or neighbor cells is reported during a period of NMR data collection time, the location estimate is computed as the centroid of the common region of various serving and/or neighbor areas and the reported power based range bands along radial and angular directions over the associated range uncertainty.

The location estimate for the case of one or more reported serving and/or neighbor cells power availability in the absence of sibling pairs over the NMR data collection time could be computed in real time or loaded from a pre-established location mapping table database created and maintained offline for each individual serving or neighbor cell or multiple serving and/or neighbor cells combinations within a specific location service area (LSA).

FIG. 19

Figure 19:
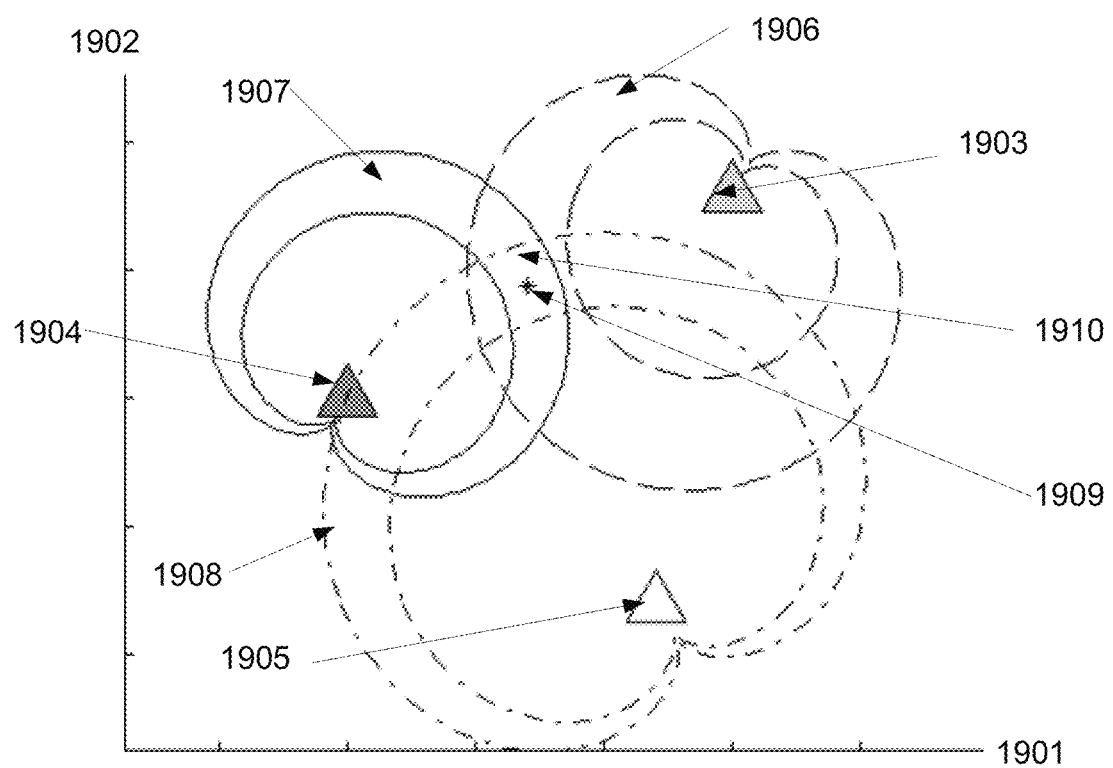
FIG. 19 graphically depicts location estimation based on power ranging from the serving cell and at least two neighboring cells.

FIG. 19 graphically depicts location estimation based on power ranging from the serving cell and at least two neighboring cells. In this example, three base stations 1903 1904 1905 serve a geographic region dimensioned by latitude 1901 and longitude 1902. Three power derived range bands 1906 1907 1908 are available for positioning. The common area 1910 created from the intersection of the three power range bands 1906 1907 1908 all calculation of the centroid 1909 of the common area 1910. The centroid 1909 is reported as the estimated location while the common area 1910 size and shape are reported as the error estimate.

FIG. 20

Figure 20:
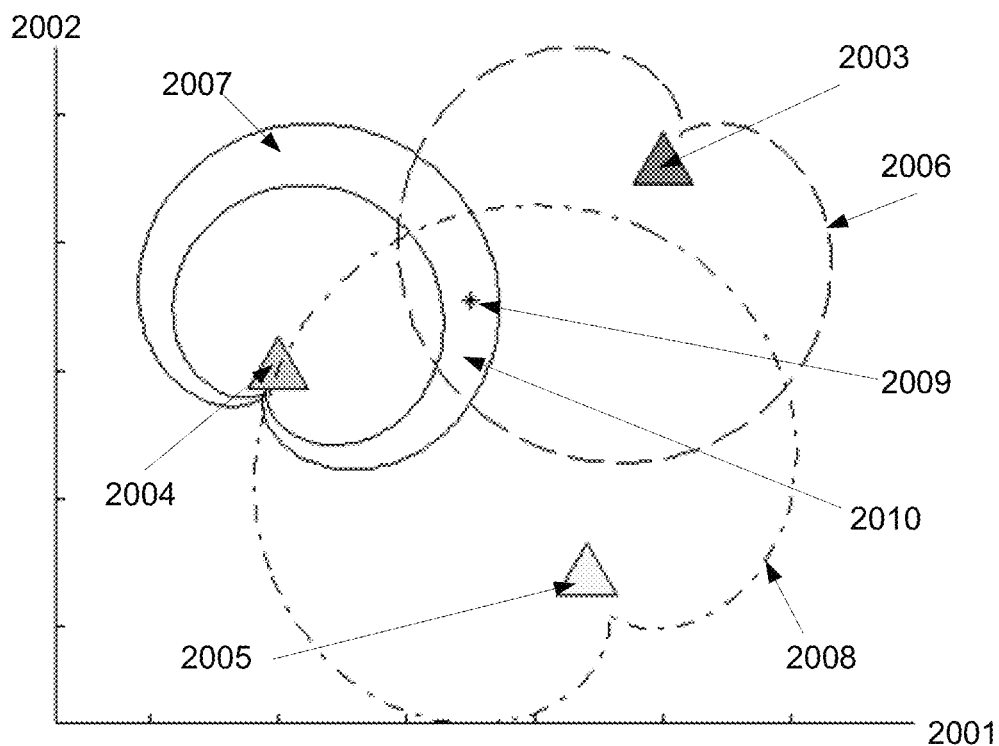
FIG. 20 graphically depicts location estimation based on power ranging from the serving cell and service areas of at least two neighboring cells.

FIG. 20 graphically depicts location estimation based on power ranging from the serving cell and service areas of at least two neighboring cells. As shown on the latitude 2001 longitude 2002 map, in this example the three base stations 2003 2004 2005 have a common area 2010 formed from the service areas 2006 2008 of the neighboring cells 2035 2003 and a power range band 2007 from the serving cell 2004. Based on the common area 2010, the centroid 2009 is calculated. The centroid 2009 is then is reported as the estimated location while the common area 2010 size and shape are reported as the error estimate.

4) LES4: When Cell Identifier and Power Information is Available for Two or more Serving and/or Neighbor Cells with One or more Sibling Pairs A special case of using power measurements from at least one pair of sibling cells could simplify the overall location estimation system complexity and deployment costs to achieve same level of accuracy by cancelling out the complex radio propagation path impairments between the sibling cells and the MS. A sibling pair comprises two downlink transmission antennae of a multi-sector cell site, which are located within 100 m from each other and their antenna pattern main beam pointing to different directions.

When a single sibling pair is only reported in the input NMR data, the location estimate is computed as the centroid of the common region between the estimated azimuth angular band with the associated uncertainty from the sibling cell tower location based on the relative power, the power based distance bands along radial and azimuthal direction over the associated range uncertainty and the serving and/or the neighbor areas of all the individual reported cells. The final location estimate is restricted to be within the sibling pair based azimuth band.

When two or more sibling pairs are reported in the input NMR data, the preliminary search area is computed as the common region of the corresponding azimuth bands estimated from each sibling pair tower location based on their relative power. The preliminary search area is further reduced by using the maximum overlapped area of serving and/or neighbor areas as well as the power based distance bands along radial and azimuthal direction over the associated range uncertainty of the individual reported cells, if possible. The final location estimate is computed as the centroid of the reduced preliminary search area and is restricted to be within the sibling pairs relative power based preliminary search area.

The location estimate for the case of one or more reported serving and/or neighbor cells power availability in the presence of sibling pairs over the NMR data collection time could be computed in real time or loaded from a pre-established location mapping table database created and maintained offline for each primary serving cell or multiple serving and/or neighbor cells combinations within a specific location service area (LSA).

FIG. 21

Figure 21:
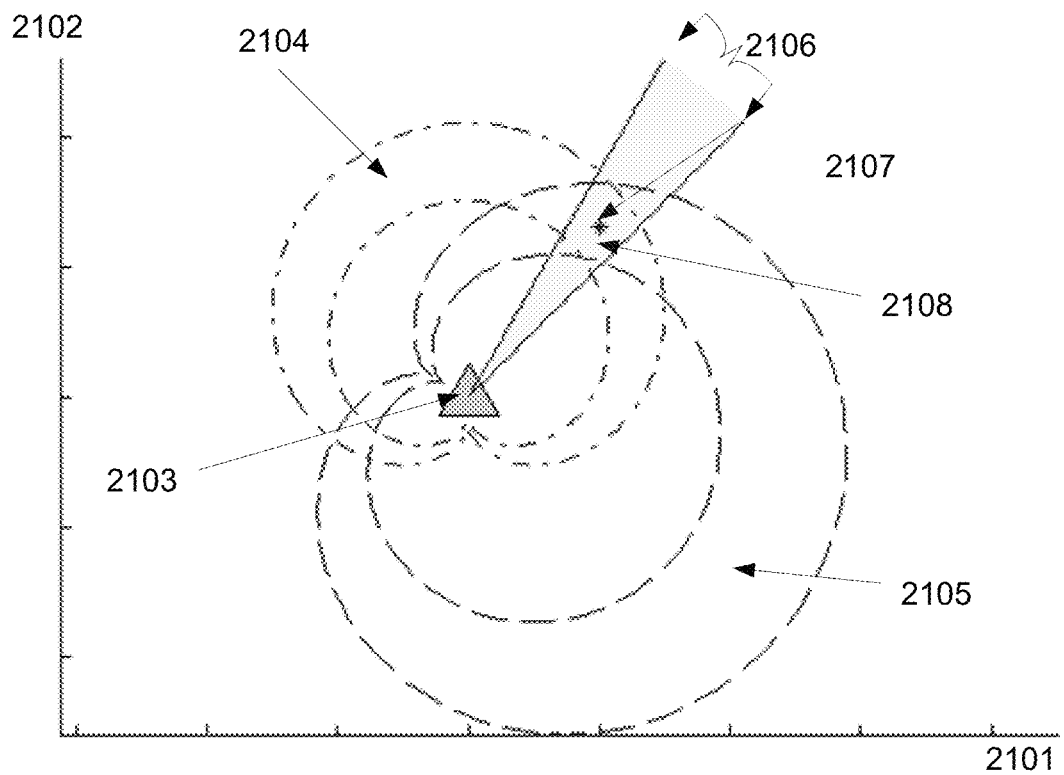
FIG. 21 graphically depicts location estimation based on power ranging from the serving cell and a sibling neighbor cell.

FIG. 21 graphically depicts location estimation based on power ranging from the serving cell and a sibling neighbor cell. Plotted on a latitudinal 2101 and longitudinal 2102 map, a single basestation 2103 supports at least two cells (sectors). Known as sibling pair prior to location calculation, the two sibling cells allow production of two power-based range bands 2104 2105 and an angle vector 2106. The intersection of the power range bands 2104 2105 and the angle vector 2106 produce an equipotential area 2108 in which the centroid 2107 is reported as the location estimate and the equipotential area 2108 is reported as the error estimate.

FIG. 22

Figure 22:
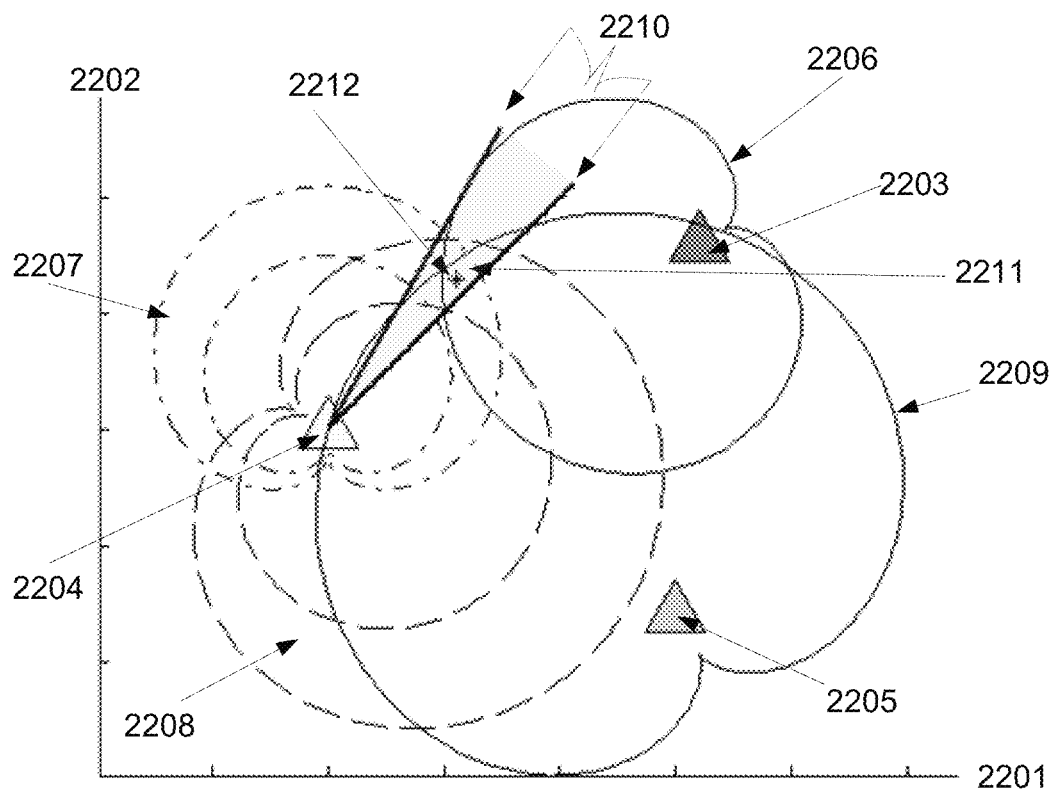
FIG. 22 graphically depicts location estimation using power ranging between sibling cells and the service area of at least one additional neighbor cell.

FIG. 22 graphically depicts location estimation using power ranging between sibling cells and the service area of at least one additional neighbor cell. In this example, three base stations 2203 2204 2205 are depicted on a geographical area defined by latitude 2203 and longitude 2202. At least one base station 2204 has a sibling pair set of cells (sectors). From the sibling pair, two power-range bands 2207 2208 and an angle vector 2210 can be determined. These measurements combined with the service areas 2206 2209 from the nearby base stations 2203 2205 form a common area 2211 (in this example). The centroid 2212 of the common area 2211 is reported as the location estimate and the equipotential common area 2211 is reported as the error estimate.

FIG. 23

Figure 23:
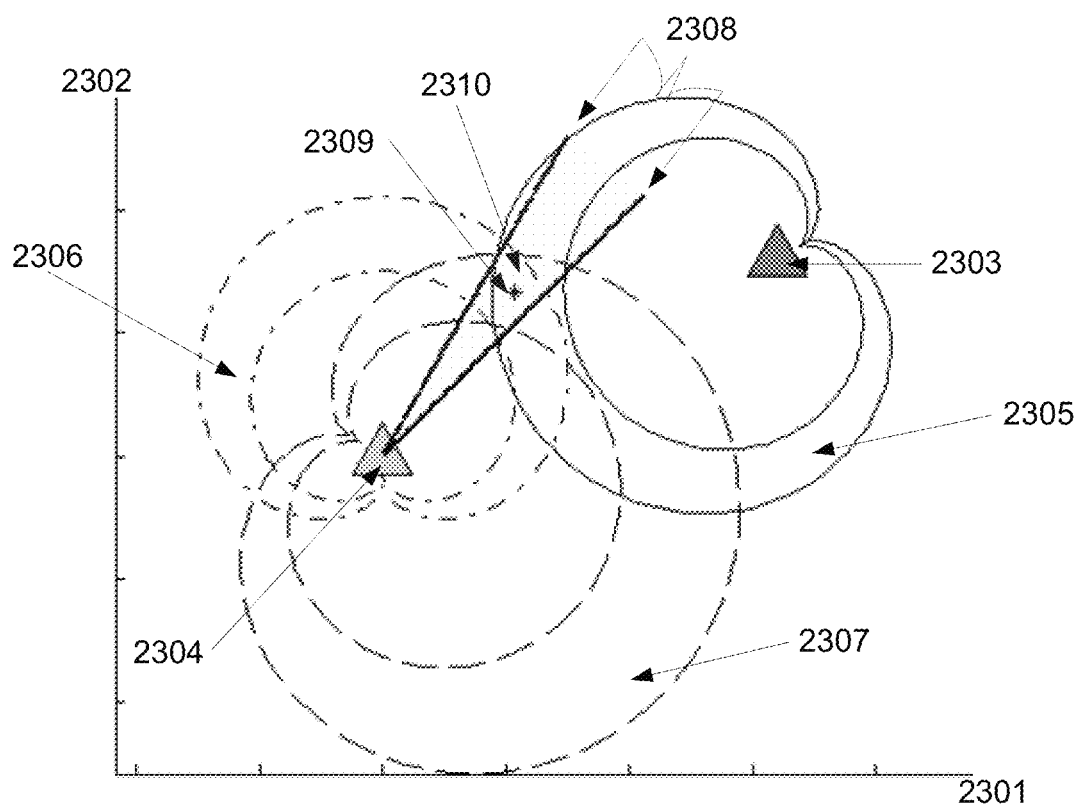
FIG. 23 graphically depicts location estimation using power ranging between sibling cells and the power range from one additional neighbor cell.

FIG. 23 graphically depicts location estimation using power ranging between sibling cells and the power range from one additional neighbor cell. As shown on the map of latitude 2301 and longitude 2302, at least two base stations 2303 2304 are geographically proximate. One base station 2303 has a sibling pair of cells (sectors) allowing two power measurements and thus two power-range bands 2306 2307 to be calculated. Also from the two power measurements, an angle vector 2308 can be derived. Using the power-range band 2305 determined from the transmissions from the other basestation 2303 with the aforementioned, a common area 2310 may be determined The centroid 2309 of the common area 2310 is reported as the location estimate and the equipotential common area 2310 is reported as the error estimate.

5) LES5: When Cell Identifier, Time and/or Power Information is Available for One or more Serving and/or Neighbor Cells without Any Sibling Pair When timing information for one or more serving cells are reported over a period of NMR data collection time, the preliminary search area is computed as the common region of various serving cell sector's timing based range bands along radial and angular directions over associated range uncertainty.

The timing based preliminary search area could be further reduced by using the power based distance bands along radial and azimuthal direction over the associated range uncertainty, the serving and neighbor areas of all the reported serving and neighbor cells. The final location estimate is computed as the centroid of the final search area and is restricted to be within the timing based preliminary search area.

The location estimate for the case of one or more reported serving and/or neighbor cells time and/or power availability in the absence of sibling pairs over the NMR data collection time could be computed in real time or loaded from a pre-established location mapping table database created and maintained offline for each primary serving cell or multiple serving and/or neighbor cells combinations within a specific location service area (LSA).

FIG. 24

Figure 24:
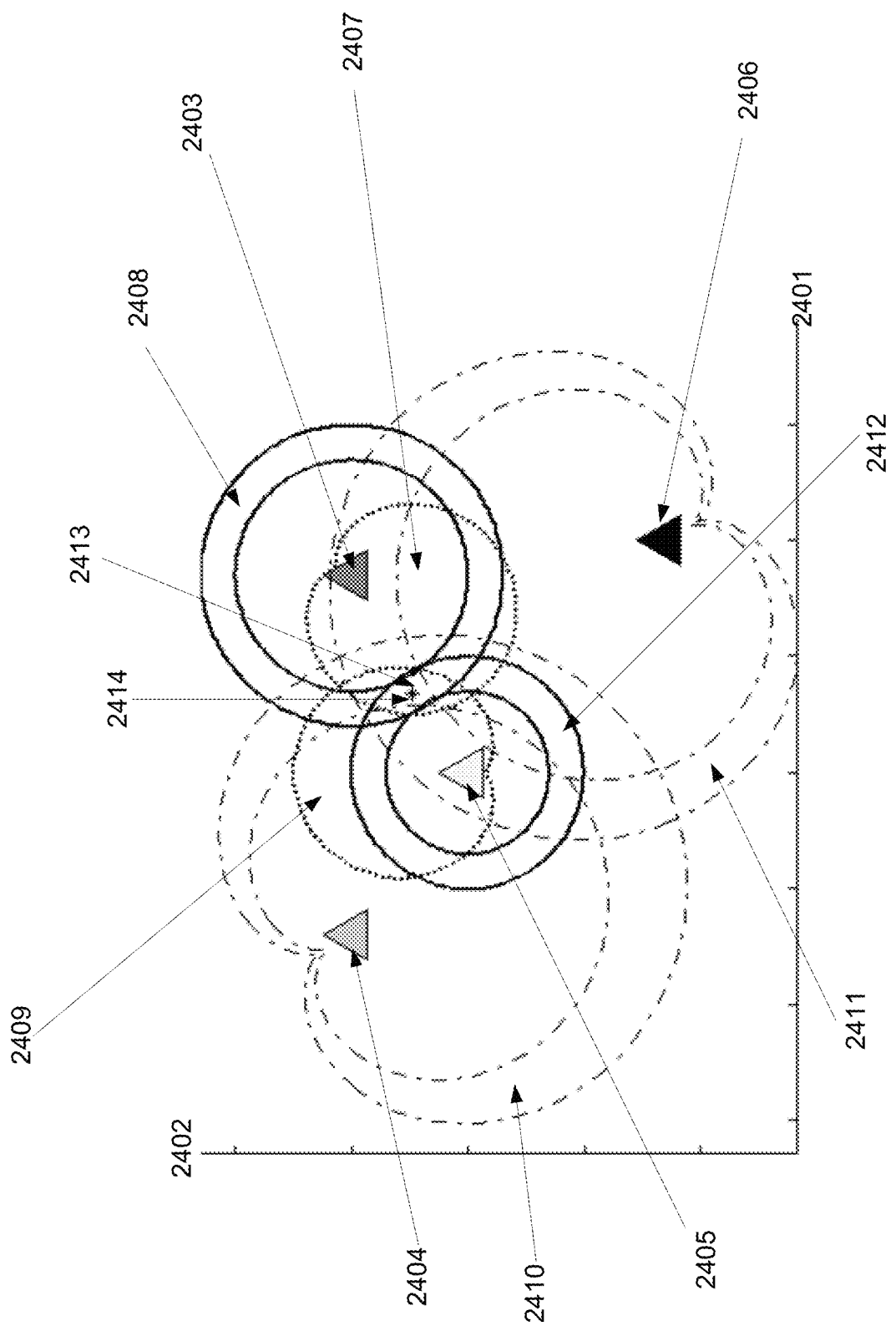
FIG. 24 graphically depicts location estimation using cell identifier, time and/or power information as available for one or more serving and/or neighbor cells without any sibling pair.

FIG. 24 graphically depicts location estimation using cell identifier, time and/or power information as available for one or more serving and/or neighbor cells without any sibling pair(s). As shown on the map of latitude 2401 and longitude 2402, four base stations 2403 2404 2405 2406 are geographically proximate. In this example, two base stations 2404 2406 have cells with power reported and thus two power range bands 2410 2411 can be plotted for the reporting cells (sectors). Two basestations 24032405 have both a reporting cell (producing serving areas 2407 2409) and a timing range for each cell 2408 2412. Combining the geographical areas of the service area(s) 2402 2409, the power range band(s) 2410 2411, and the timing band(s) 2408 2412 yields a common area 2413. The centroid 2414 of the common area 2413 is reported as the location estimate and the equipotential common area 2413 is reported as the error estimate.

6) LES6: When Cell Identifier, Time and/or Power Information is Available for One or more Serving and Neighbor Cells with One or more Sibling Pairs When timing information for one or more serving cells are reported over a period of NMR data collection time, the preliminary search area is computed as the common region of various serving cell sector's timing based range bands along radial and angular directions over associated range uncertainty. The serving cells timing based search area is further reduced by taking the maximum overlapping region of the estimated azimuth bands from the one or more sibling cell towers based on the sibling pairs relative power.

The timing and sibling pair relative power based preliminary search area could be further reduced by using the power based distance bands along radial and azimuthal direction over the associated range uncertainty, the serving and neighbor areas of all the reported serving and neighbor cells. The final location estimate is computed as the centroid of the final search area and is restricted to be within the timing and sibling pair relative power based preliminary search area.

The location estimate for the case of one or more reported serving and/or neighbor cells time and/or power availability with the presence of sibling pairs over the NMR data collection time could be computed in real time or loaded from a pre-established location mapping table database created and maintained offline for each primary serving cell or multiple serving and/or neighbor cells combinations within a specific location service area (LSA).

FIG. 25

Figure 25:
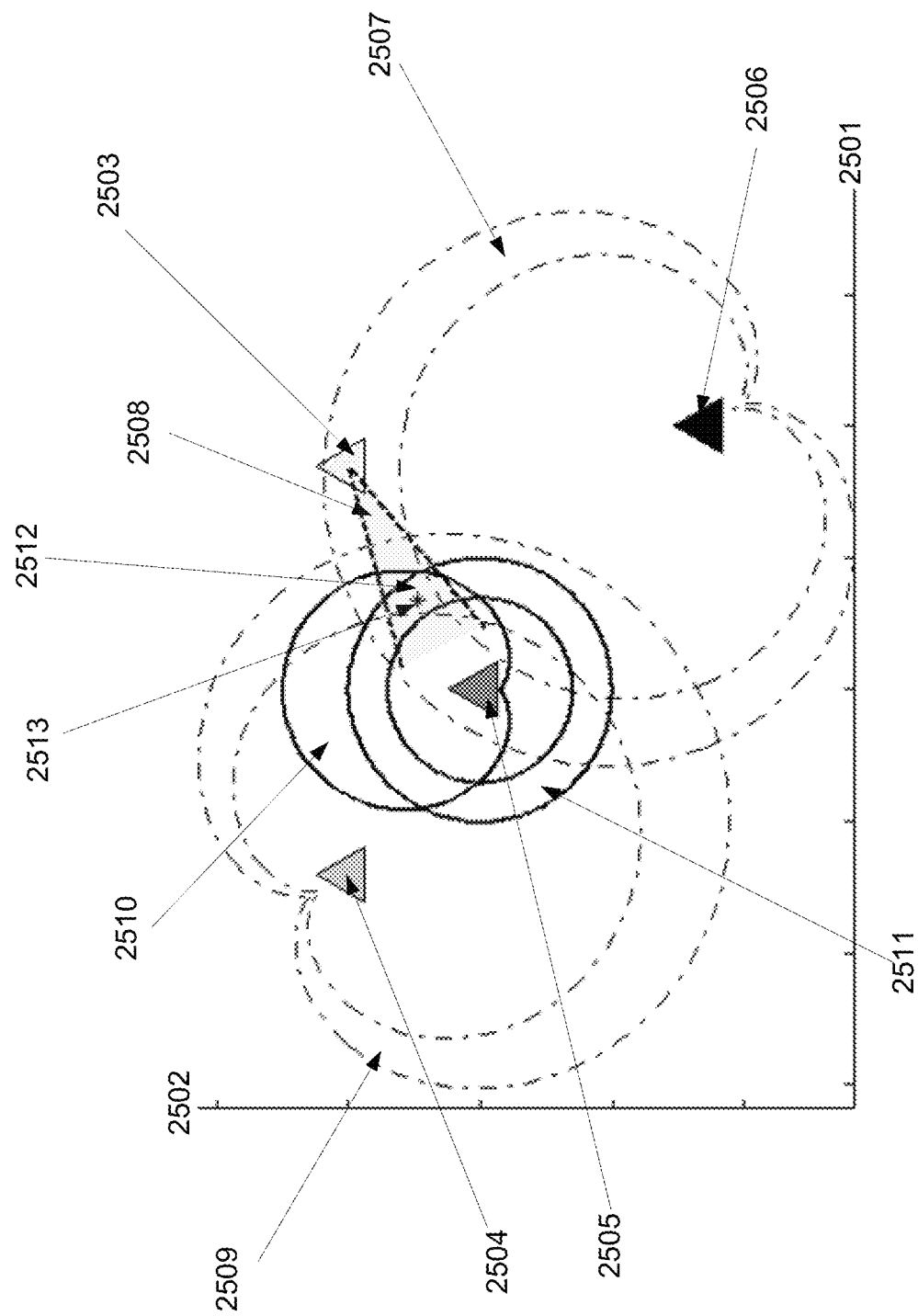
FIG. 25 graphically depicts location estimation using cell identifier, time and/or power information as available for one or more serving and neighbor cells with one or more sibling pairs.

FIG. 25 graphically depicts location estimation using cell identifier, time and/or power information as available for one or more serving and neighbor cells with one or more sibling pairs. As shown on the map of latitude 2501 and longitude 2502, four base stations 2503 2504 2505 2506 are geographically proximate in this example. Two base stations 2404 2406 have cells with power reported and thus two power range bands 2507 2509 can be plotted for the reporting cells (sectors). One base station 2505 has both a reporting cell (producing serving area 2510) and a cell with timing range 2511. A base station 2503 has two similarly equipped cells reporting power, so a sibling pair condition exists and a power-based angle is produced 2508. Combining the geographical areas of the service area 2510, the power range band(s) 2507 2509, the timing band 2511 and the angle measurement from the sibling pair yields a common area 2512. The centroid 2513 of the common area 2512 is reported as the location estimate and the equipotential common area 2512 is reported as the error estimate.

Any of the above mentioned aspects can be implemented in methods, systems, computer readable media, or any type of manufacture. It should be understood to those skilled in the art that the various techniques described herein may be implemented in connection with hardware or software or, where appropriate, with a combination of both. For example, aspects of the invention may execute on a programmed computer. Thus, the methods and apparatus of the invention, or certain aspects or portions thereof, may take the form of program code (i.e., instructions) embodied in tangible media, such as floppy diskettes, CD-ROMs, hard drives, or any other machine-readable storage medium wherein, when the program code is loaded into and executed by a machine, such as a computer, the machine becomes an apparatus for practicing the invention. In the case of program code execution on programmable computers, the computing device generally includes a processor, a storage medium readable by the processor (including volatile and non-volatile memory and/or storage elements), at least one input device, and at least one output device. Such programs are preferably implemented in a high level procedural or object oriented programming language to communicate with a computer system. However, the program(s) can be implemented in assembly or machine language, if desired. In any case, the language may be a compiled or interpreted language, and combined with hardware implementations. In example embodiments a computer readable storage media can include for example, random access memory (RAM), a storage device, e.g., electromechanical hard drive, solid state hard drive, etc., firmware, e.g., FLASH RAM or ROM, and removable storage devices such as, for example, CD-ROMs, floppy disks, DVDs, FLASH drives, external storage devices, etc. It should be appreciated by those skilled in the art that other types of computer readable storage media can be used such as magnetic cassettes, flash memory cards, digital video disks, Bernoulli cartridges, and the like. The computer readable storage media may provide non-volatile storage of processor executable instructions, data structures, program modules and other data for a computer.

Conclusion

The true scope of the present invention is not limited to the presently preferred embodiments disclosed herein. For example, the foregoing disclosure of methods and systems for use in locating a mobile device and for computationally selecting a location estimate solution uses explanatory terms, such as wireless location system, base transceiver station (BTS), Network Measurement Report (NMR), timing advance (TA), cell identifier, scenarios (LES1, LES2, etc.), and the like, which should not be construed so as to limit the scope of protection of the following claims, or to otherwise imply that the inventive aspects of the time and power based location techniques and ways of selecting a location estimate solution are limited to the particular methods and apparatus disclosed. Accordingly, except as they may be expressly so limited, the scope of protection of the following claims is not intended to be limited to the specific embodiments described above.

We claim:

1. A method for selecting a location estimate solution in a wireless location system, comprising:
    collecting network measurement report (NMR) data over a duration of time;
    pre-processing the NMR data;
    determining from the pre-processed NMR data that no cells are present with valid timing measurements;
    determining from the pre-processed NMR data that no cells are present with valid power measurements; and
    activating a scenario (LES1) for selecting a location estimate solution when only cell identifier information is available;
    wherein the LES1 scenario comprises:
    determining whether only a single serving cell identifier is reported, and if so computing a location estimate as a centroid of a serving cell's serving geographic area;
    determining whether two or more serving cell identifiers are reported, and if so computing the location estimate as a centroid of a common region with a highest number of overlapping serving geographic areas of the reported serving cells;
    determining whether one or more neighbor cell identifiers are reported without any serving cell information, and if so computing the location estimate as a centroid of a common region with a highest number of overlapping neighbor geographic areas of the reported neighbor cells; and determining whether one or more neighbor cells are reported in addition to one or more serving cells, and if so computing the location estimate as a centroid of a common region of various serving geographic areas of the reported serving cells with a highest number of cells overlapping, wherein the computed location estimate is biased towards the direction of a centroid of maximum overlapping of neighbor geographic areas of the additional reported neighbor cells.

2. A method for selecting a location estimate solution in a wireless location system, comprising:

collecting network measurement report (NMR) data over a duration of time pre-processing the NMR data;

determining from the pre-processed NMR data that at least one cell is present with valid timing measurements;

determining from the pre-processed NMR data that no cells are present with valid power measurements; and activating a scenario (LES2) for selecting a location estimate solution when only cell identifier and timing information is available;

wherein the LES2 scenario comprises:

determining whether timing information for a single serving cell is reported during a period of NMR data collection time, and if so computing a location estimate as a centroid of a serving cell sector's timing based range band along a radial direction over associated range uncertainty and along an angular direction within a serving area of the serving cell;

determining whether timing information for two or more serving cells is reported over a period of NMR data collection time, and if so computing the location estimate as a centroid of a common region of various serving cell sector's timing based range bands along a radial direction over an associated range uncertainty and along an angular direction within serving areas of the reported serving cells, wherein a final location estimate is restricted to be within a primary serving cell's distance range band along a direction of a common region's centroid from the primary serving cell's location;

determining whether one or more serving cell identifiers are also reported without any timing information in addition to one or more serving cells with valid timing information, and if so computing the location estimate as a centroid of a timing information based common region and further biased towards a direction of maximum overlapping of serving cell geographic areas of the additional reported serving cells, wherein a final location estimate is restricted to be within the primary serving cell's distance range band along a direction of a previous best location estimate from the primary serving cell's location; and determining whether one or more neighbor cell identifiers are reported without any power information in addition to one or more serving cells with timing information, and if so computing the location estimate as a centroid of the timing information based common region and biased further towards a direction of maximum overlapping of neighbor geographic areas of the additional reported neighbor cells, wherein a final location estimate is restricted to be within the primary serving cell's distance range band along the direction of the previous best location estimate from the primary serving cell's location.

3. A method for selecting a location estimate solution in a wireless location system, comprising:

collecting network measurement report (NMR) data over a duration of time pre-processing the NMR data;

determining from the pre-processed NMR data that no cells are present with valid timing measurements;

determining from the pre-processed NMR data that at least one cell is present with valid power measurements;

determining that no sibling pairs are present; and activating a scenario (LES3) for selecting a location estimate solution when only cell identifiers and power information are available for one or more serving and/or neighbor cells without any sibling pairs based on a result of determining the presence of cells with the valid timing and power measurements.

4. The method recited in claim 3, wherein the LES3 scenario comprises:

determining whether only power information for one or more serving cells is reported during a period of NMR data collection time, and if so computing a location estimate as a centroid of a region with a highest number of overlapping of various serving cell serving areas and reported power based range bands along a radial direction over associated range uncertainty;

determining whether only power information for one or more neighbor cells is reported during a period of NMR data collection time, and if so computing the location estimate as a centroid of a region with a highest number of overlapping of various neighbor areas and reported power based range bands along a radial direction over associated range uncertainty; and determining whether power information for two or more serving and/or neighbor cells is reported during a period of NMR data collection time, and if so computing the location estimate as a centroid of a common region of various serving and/or neighbor areas and reported power based range bands along radial and angular directions over associated range uncertainty.

5. A method for selecting a location estimate solution in a wireless location system, comprising:

collecting network measurement report (NMR) data over a duration of time;

pre-processing the NMR data;

determining from the pre-processed NMR data that no cells are present with valid timing measurements;

determining from the pre-processed NMR data that at least one cell is present with valid power measurements;

determining that at least one sibling pair is present; and activating a scenario (LES4) for selecting a location estimate solution when cell identifier and power information is available for two or more serving and/or neighbor cells with one or more sibling pairs based on a result of determining the presence of cells with the valid timing and power measurements.

6. The method recited in claim 5, wherein the LES4 scenario comprises:

determining whether only a single sibling pair is reported in the NMR data, and if so computing a location estimate as a centroid of a common region between an estimated azimuth angular band with associated uncertainty from a sibling cell tower location based on relative power, power based distance bands along radial and azimuthal directions over an associated range uncertainty and serving and/or neighbor areas of all reported cells, wherein a final location estimate is restricted to be within a sibling pair based azimuth band; and determining whether two or more sibling pairs are reported in the NMR data, and if so computing a preliminary search area as a common region of corresponding azimuth bands estimated from each sibling pair tower location based on their relative power.

7. The method recited in claim 6, wherein the preliminary search area is further reduced by using a maximum overlapped area of serving and/or neighbor areas as well as power based distance bands along radial and azimuthal directions over an associated range uncertainty of the reported cells, and wherein a final location estimate is computed as a centroid of the reduced preliminary search area and is restricted to be within a sibling pair's relative power based preliminary search area.

8. A method for selecting a location estimate solution in a wireless location system, comprising:
collecting network measurement report (NMR) data over a duration of time
pre-processing the NMR data;
determining from the pre-processed NMR data that at least one cell is present with valid timing measurements;
determining from the pre-processed NMR data that at least one cell is present with valid power measurements;
determining that no sibling pairs are present; and
activating a scenario (LES5) for selecting a location estimate solution when cell identifier, timing and/or power information is available for one or more serving and/or neighbor cells without any sibling pairs based on a result of determining the presence of cells with the valid timing and power measurements.

9. The method recited in claim 8, wherein the LES5 scenario comprises:
determining whether timing information for one or more serving cells is reported over a period of NMR data collection time, and if so a preliminary search area is computed as a common region of various serving cell sector's timing based range bands along radial and angular directions over associated range uncertainty; and
reducing the timing based preliminary search area by using power based distance bands along radial and azimuthal directions over an associated range uncertainty, serving and neighbor areas of all reported serving and neighbor cells, wherein a final location estimate is computed as a centroid of a final search area and is restricted to be within the timing based preliminary search area.

10. A method for selecting a location estimate solution in a wireless location system, comprising:
collecting network measurement report (NMR) data over a duration of time;
pre-processing the NMR data;
determining from the pre-processed NMR data that at least one cell is present with valid timing measurements;
determining from the pre-processed NMR data that at least one cell is present with valid power measurements;
determining that at least one sibling pair is present; and
activating a scenario (LES6) for selecting a location estimate solution when cell identifier, time and/or power information is available for one or more serving and neighbor cells with one or more sibling pairs based on a result of determining the presence of cells with the valid timing and power measurements.

11. The method recited in claim 10, wherein the LES6 scenario comprises:
determining whether timing information for one or more serving cells is reported over a period of NMR data collection time, and if so a preliminary search area is computed as a common region of various serving cell sector's timing based range bands along radial and angular directions over associated range uncertainty;
reducing a serving cell's timing based search area by taking a maximum overlapping region of estimated azimuth bands from the-one or more sibling cell towers based on the one or more sibling pairs' relative power; and
further reducing the timing and sibling pair relative power based preliminary search area by using power based distance bands along radial and azimuthal directions over an associated range uncertainty, serving and neighbor areas of all reported serving and neighbor cells, wherein a final location estimate is computed as a centroid of a final search area and is restricted to be within the timing and sibling pair relative power based preliminary search area.

12. The method recited in any one of claim 1, 2, 3, 5, 8, or 10, wherein a location estimate is computed in real time.

13. The method recited in any one of claim 1, 2, 3, 5, 8, or 10, wherein a location estimate is loaded from a pre-established location mapping table database created and maintained offline for each individual serving or neighbor cell or multiple serving and/or neighbor cell combinations within a specific location service area (LSA).

14. A wireless location system (WLS) configured to select a location estimate solution using network measurement report (NMR) data collected over a duration of time, wherein the system is configured to:
pre-process the NMR data;
determine that no cells are present with valid timing measurements;
determine that no cells are present with valid power measurements; and
activate a scenario (LES1) for selecting a location estimate solution when only cell identifier information is available, wherein the LES1 scenario comprises:
determining whether only a single serving cell identifier is reported, and if so computing a location estimate as a centroid of a serving cell's serving geographic area;
determining whether two or more serving cell identifiers are reported, and if so computing the location estimate as a centroid of a common region with a highest number of overlapping serving geographic areas of the reported serving cells;
determining whether one or more neighbor cell identifiers are reported without any serving cell information, and if so computing the location estimate as a centroid of a common region with a highest number of overlapping neighbor geographic areas of the reported neighbor cells; and
determining whether one or more neighbor cells are reported in addition to one or more serving cells, and if so computing the location estimate as a centroid of a common region of various serving geographic areas of the reported serving cells with a highest number of cells overlapping, wherein the computed location estimate is biased towards the direction of a centroid of maximum overlapping of neighbor geographic areas of the additional reported neighbor cells.

15. A wireless location system (WLS) configured to select a location estimate solution using network measurement report (NMR) data collected over a duration of time, wherein the system is configured to:
pre-process the NMR data;
determine that at least one cell is present with valid timing measurements;
determine that no cells are present with valid power measurements; and activate a scenario (LES2) for selecting a location estimate solution when only cell identifier and timing information is available, wherein the LES2 scenario comprises:

determining whether timing information for a single serving cell is reported during a period of NMR data collection time, and if so computing a location estimate as a centroid of a serving cell sector's timing based range band along a radial direction over associated range uncertainty and along an angular direction within a serving area of the serving cell;

determining whether timing information for two or more serving cells is reported over a period of NMR data collection time, and if so computing the location estimate as a centroid of a common region of various serving cell sector's timing based range bands along a radial direction over an associated range uncertainty and along an angular direction within serving areas of the reported serving cells, wherein a final location estimate is restricted to be within a primary serving cell's distance range band along a direction of a common region's centroid from the primary serving cell's location;

determining whether one or more serving cell identifiers are also reported without any timing information in addition to one or more serving cells with valid timing information, and if so computing the location estimate as a centroid of a timing information based common region and further biased towards a direction of maximum overlapping of serving cell geographic areas of the additional reported serving cells, wherein a final location estimate is restricted to be within the primary serving cell's distance range band along a direction of a previous best location estimate from the primary serving cell's location; and determining whether one or more neighbor cell identifiers are reported without any power information in addition to one or more serving cells with timing information, and if so computing the location estimate as a centroid of the timing information based common region and biased further towards a direction of maximum overlapping of neighbor geographic areas of the additional reported neighbor cells, wherein a final location estimate is restricted to be within the primary serving cell's distance range band along the direction of the previous best location estimate from the primary serving cell's location.

16. A wireless location system (WLS) configured to select a location estimate solution using network measurement report (NMR) data collected over a duration of time, wherein the system is configured to:

pre-process the NMR data;
determine from the pre-processed NMR data that no cells are present with valid timing measurements;
determine from the pre-processed NMR data that at least one cell is present with valid power measurements;
determine that no sibling pairs are present; and
activate a scenario (LES3) for selecting a location estimate solution when only cell identifiers and power information are available for one or more serving and/or neighbor cells without any sibling pairs based on a result of determining the presence of cells with the valid timing and power measurements.

17. The system recited in claim 16, wherein the LES3 scenario comprises:

determining whether only power information for one or more serving cells is reported during a period of NMR data collection time, and if so computing a location estimate as a centroid of a region with a highest number of overlapping of various serving cell serving areas and reported power based range bands along a radial direction over associated range uncertainty;

determining whether only power information for one or more neighbor cells is reported during a period of NMR data collection time, and if so computing the location estimate as a centroid of a region with a highest number of overlapping of various neighbor areas and reported power based range bands along a radial direction over associated range uncertainty; and determining whether power information for two or more serving and/or neighbor cells is reported during a period of NMR data collection time, and if so computing the location estimate as a centroid of a common region of various serving and/or neighbor areas and reported power based range bands along radial and angular directions over associated range uncertainty.

18. A wireless location system (WLS) configured to select a location estimate solution using network measurement report (NMR) data collected over a duration of time, wherein the system is configured to:

pet-process the NMR data;
determine from the pre-processed NMR data that no cells are present with valid timing measurements;
determine from the pre-processed NMR data that at least one cell is present with valid power measurements;
determine that at least one sibling pair is present; and
activate a scenario (LES4) for selecting a location estimate solution when cell identifier and power information is available for two or more serving and/or neighbor cells with one or more sibling pairs based on a result of determining the presence of cells with the valid timing and power measurements.

19. The system recited in claim 18, wherein the LES4 scenario comprises:

determining whether only a single sibling pair is reported in the NMR data, and if so computing a location estimate as a centroid of a common region between an estimated azimuth angular band with associated uncertainty from a sibling cell tower location based on relative power, power based distance bands along radial and azimuthal directions over an associated range uncertainty and serving and/or neighbor areas of all reported cells, wherein a final location estimate is restricted to be within a sibling pair based azimuth band; and determining whether two or more sibling pairs are reported in the NMR data, and if so computing a preliminary search area as a common region of corresponding azimuth bands estimated from each sibling pair tower location based on their relative power.

20. The system recited in claim 19, wherein the preliminary search area is further reduced by using a maximum overlapped area of serving and/or neighbor areas as well as power based distance bands along radial and azimuthal directions over an associated range uncertainty of the reported cells, and wherein a final location estimate is computed as a centroid of the reduced preliminary search area and is restricted to be within a sibling pair's relative power based preliminary search area.

21. A wireless location system (WLS) configured to select a location estimate solution using network measurement report (NMR) data collected over a duration of time, wherein the system is configured to:

pre-process the NMR data;
determine from the pre-processed NMR data that at least one cell is present with valid timing measurements;
determine from the pre-processed NMR data that at least one cell is present with valid power measurements;

determine that no sibling pairs are present; and activate a scenario (LES5) for selecting a location estimate solution when cell identifier, timing and/or power information is available for one or more serving and/or neighbor cells without any sibling pairs based on a result of determining the presence of cells with the valid timing and power measurements.

22. The system recited in claim 21, wherein the LES5 scenario comprises:

determining whether timing information for one or more serving cells is reported over a period of NMR data collection time, and if so a preliminary search area is computed as a common region of various serving cell sector's timing based range bands along radial and angular directions over associated range uncertainty; and reducing the timing based preliminary search area by using power based distance bands along radial and azimuthal directions over an associated range uncertainty, serving and neighbor areas of all reported serving and neighbor cells, wherein a final location estimate is computed as a centroid of a final search area and is restricted to be within the timing based preliminary search area.

23. A wireless location system (WLS) configured to select a location estimate solution using network measurement report (NMR) data collected over a duration of time, wherein the system is configured to:

pre-process the NMR data;

determine from the pre-processed NMR data that at least one cell is present with valid timing measurements;

determine from the pre-processed NMR data that at least one cell is present with valid power measurements;

determine that at least one sibling pair is present; and activate a scenario (LES6) for selecting a location estimate solution when cell identifier, timing and/or power information is available for one or more serving and neighbor cells with one or more sibling pairs based on a result of determining the presence of cells with the valid timing and power measurements.

24. The system recited in claim 23, wherein the LES6 scenario comprises:

determining whether timing information for one or more serving cells is reported over a period of NMR data collection time, and if so a preliminary search area is computed as a common region of various serving cell sector's timing based range bands along radial and angular directions over associated range uncertainty;

reducing a serving cell's timing based search area by taking a maximum overlapping region of estimated azimuth bands from one or more sibling cell towers based on one or more sibling pair's relative power; and further reducing the timing and sibling pair relative power based preliminary search area by using power based distance bands along radial and azimuthal directions over an associated range uncertainty, serving and neighbor areas of all reported serving and neighbor cells, wherein a final location estimate is computed as a centroid of a final search area and is restricted to be within the timing and sibling pair relative power based preliminary search area.

25. The system recited in any one of claims 14, 15, 18, 21, or 23, wherein a location estimate is computed in real time.

26. The system recited in any one of claim 14, 15, 18, 21, or 23, wherein a location estimate is loaded from a pre-established location mapping table database created and maintained offline for each individual serving or neighbor cell or multiple serving and/or neighbor cell combinations within a specific location service area (LSA).

* * * * *